(12) United States Patent
Crabtree

(10) Patent No.: US 7,277,886 B2
(45) Date of Patent: Oct. 2, 2007

(54) METHOD OF RETRIEVING ENTITIES

(75) Inventor: Ian B Crabtree, Ipswich (GB)

(73) Assignee: British Telecommunications public limited company, London (GB)

( * ) Notice: Subject to any disclaimer, the term of this patent is extended or adjusted under 35 U.S.C. 154(b) by 346 days.

(21) Appl. No.: 10/433,063

(22) PCT Filed: Dec. 11, 2001

(86) PCT No.: PCT/GB01/05479

§ 371 (c)(1),
(2), (4) Date: May 30, 2003

(87) PCT Pub. No.: WO02/48908

PCT Pub. Date: Jun. 20, 2002

(65) Prior Publication Data

US 2004/0019592 A1 Jan. 29, 2004

(30) Foreign Application Priority Data

Dec. 15, 2000 (EP) ................... 00311228
Dec. 15, 2000 (EP) ................... 00311234
Sep. 26, 2001 (GB) ................... 0123154.7

(51) Int. Cl.
*G06F 17/30* (2006.01)

(52) U.S. Cl. ................ 707/5; 707/2; 707/3; 707/104.1; 715/502; 715/515

(58) Field of Classification Search .............. 707/2, 707/5, 100, 3, 104.1; 702/19; 395/600, 395/793; 715/502, 515
See application file for complete search history.

(56) References Cited

U.S. PATENT DOCUMENTS 6,381,605 B1 * 4/2002 Kothuri et al. ............. 707/100
6,549,907 B1 * 4/2003 Fayyad et al. ............. 707/101
6,633,882 B1 * 10/2003 Fayyad et al. ............. 707/101

* cited by examiner

*Primary Examiner*—Tim Vo
*Assistant Examiner*—Dangelino Gortayo
(74) *Attorney, Agent, or Firm*—Nixon & Vanderhye P.C.

(57) ABSTRACT

Retrieving points that can be plotted in a predetermined area are achieved where the locations of the points are indexed in an index that includes regional data. The regional data defines a plurality of regions, and each region encompasses one or more of the points. In addition, the index includes linking data, which, for each region, identifies the point or points encompassed by that region. The method includes (i) reviewing the regional data in the index to identify regions that are wholly contained by the predetermined area; and (ii) reviewing the linking data to retrieve points encompassed by the identified regions.

13 Claims, 35 Drawing Sheets

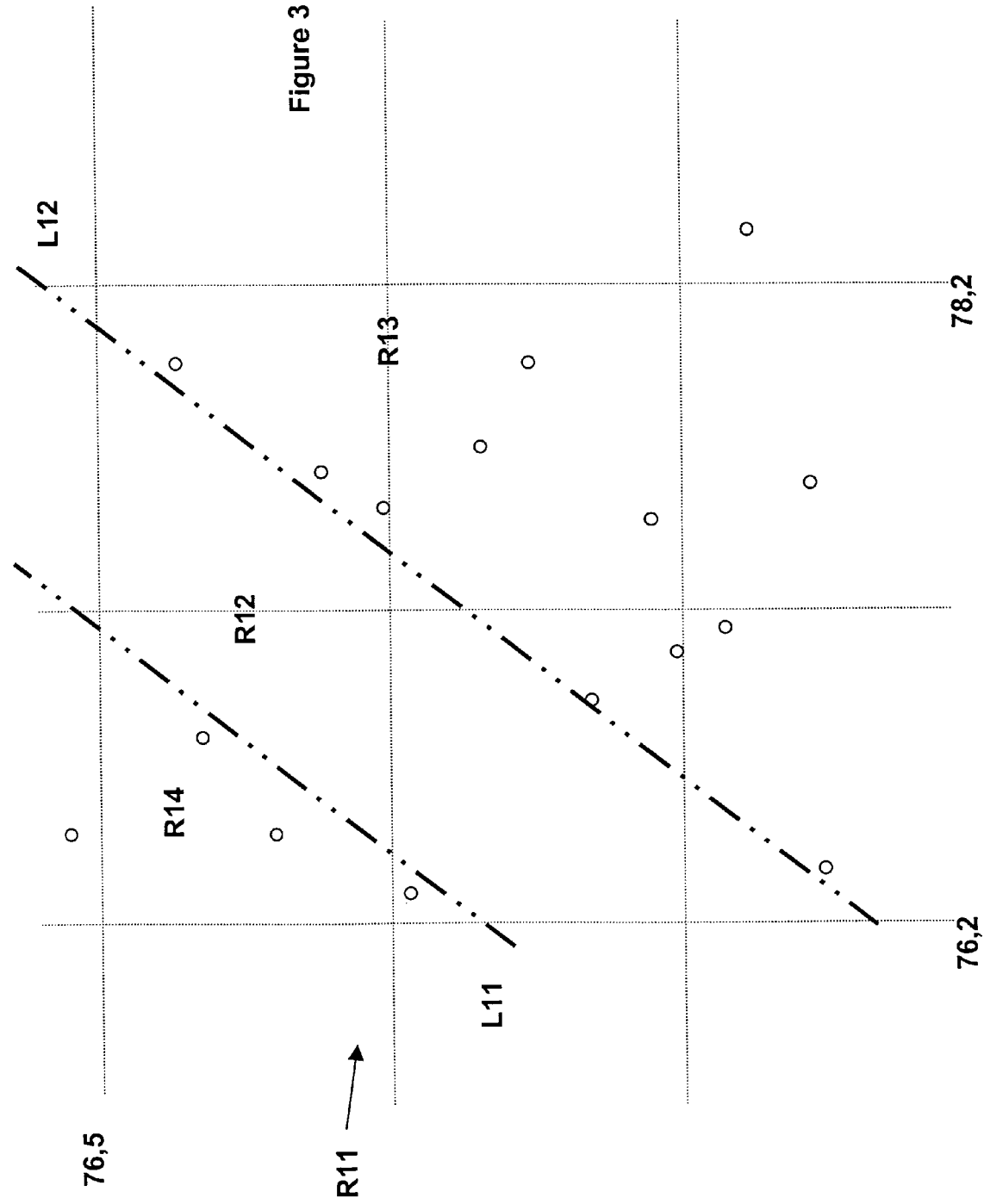

S4.2 Draw up bounding box for all points in sub quad 0,1
Process described in Figures 6 – 10 is repeated, but for sub-quad 0,1.
Once all points within sub quad 0,n are finished, the process moves onto sub quad 1,n and so on

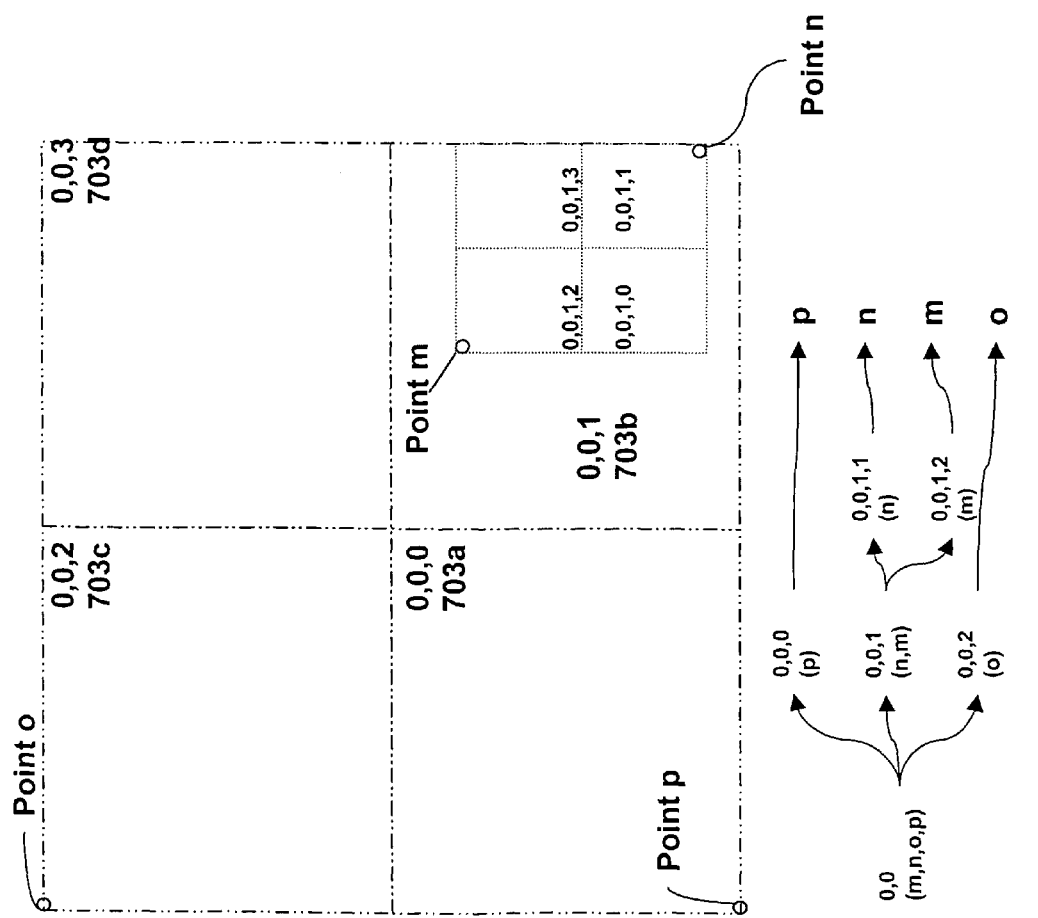
Figure 12: Storage of points for sub quad 0,0

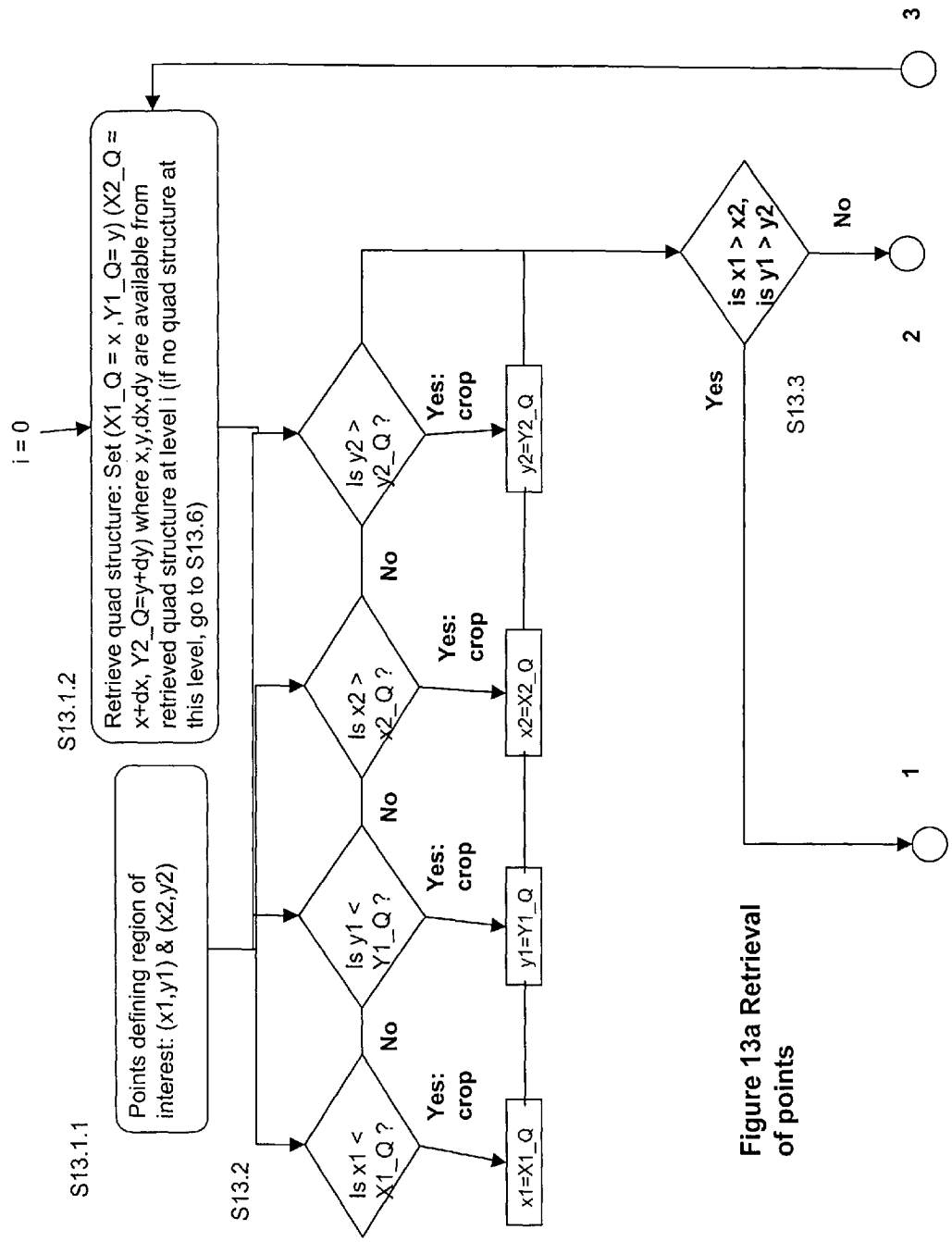
Figure 13a Retrieval of points

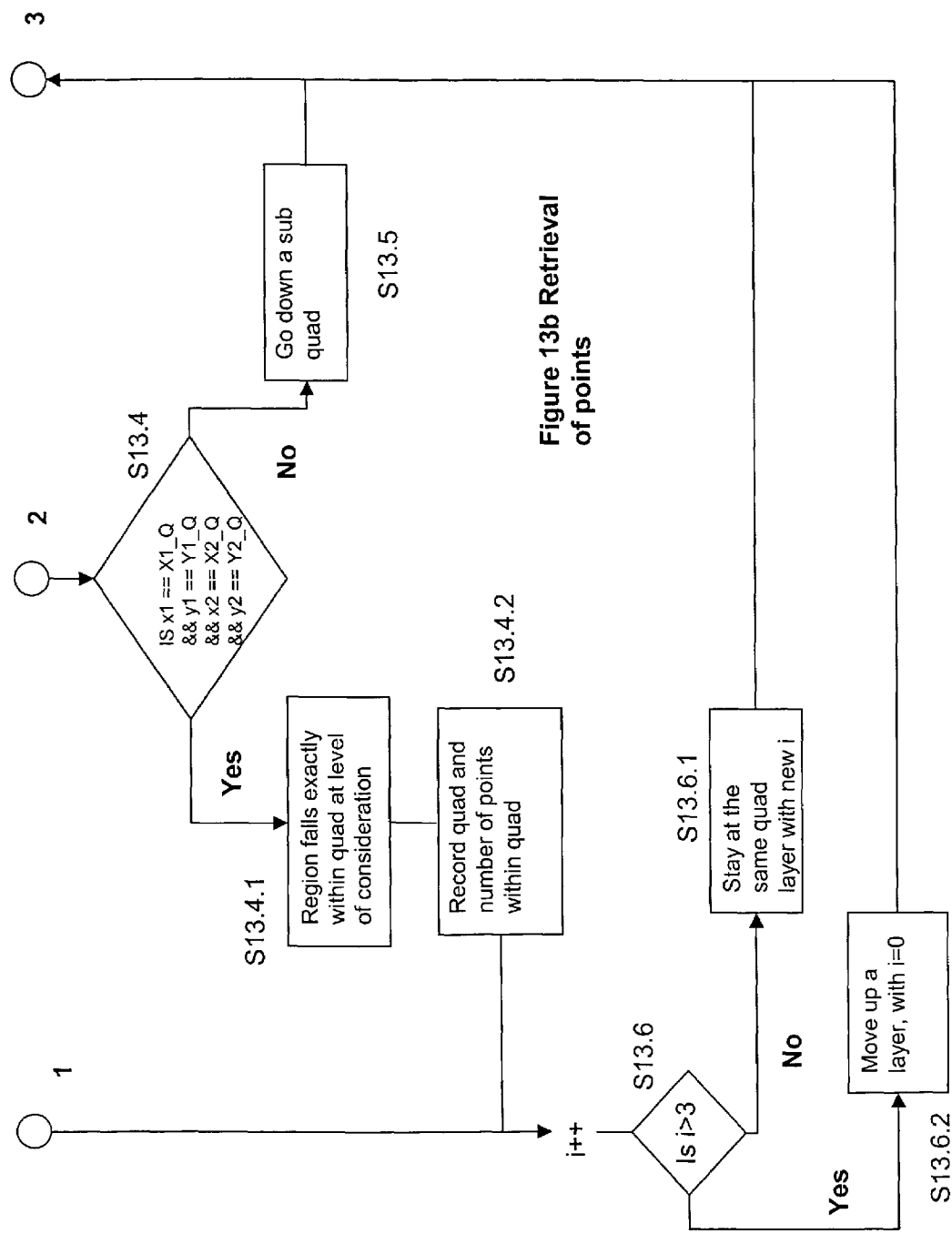

S13.1 Retrieve outermost quad

S13.2 Check size of region of interest compared to outermost quad: conditions S13.2 not satisfied, so no cropping. Go to S13.3

S13.3 conditions not satisfied,

S13.4 conditions not satisfied,

S13.5 retrieve quad at next level – quad 0 (see Figure 15)

**Figure 16:
Enlarged view
of sub-quad 0**

S13.1 Retrieve sub quad 0,0 from database

S13.2 Check size of region of interest:

x2> X2_Q & y2 > Y2_Q

SO CROP REGION OF INTEREST –

Set x2=X2_Q and y2=Y2_Q

Go to S13.3 See figure 17

Recall position of region of interest and sub quad 0,1

Cropped region of interest in sub-quad 0,1 (figure shows region post S13.2)

S13.1 Retrieve sub quad 0,1 from database

S13.2 Check size of region of interest:

x1< X1_Q & y2 > Y2_Q

SO CROP REGION OF INTEREST -

Set x1=X1_Q and y2=Y2_Q

S13.3 conditions are not satisfied,

S13.4 conditions are not satisfied,

S13.5 retrieve sub quad at next level: retrieve sub quad 0,1,0

See figure 20

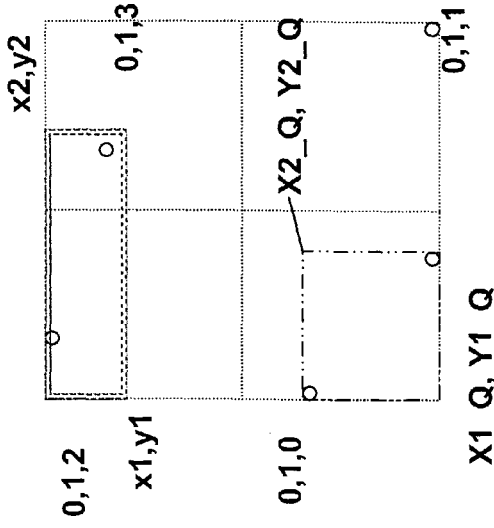
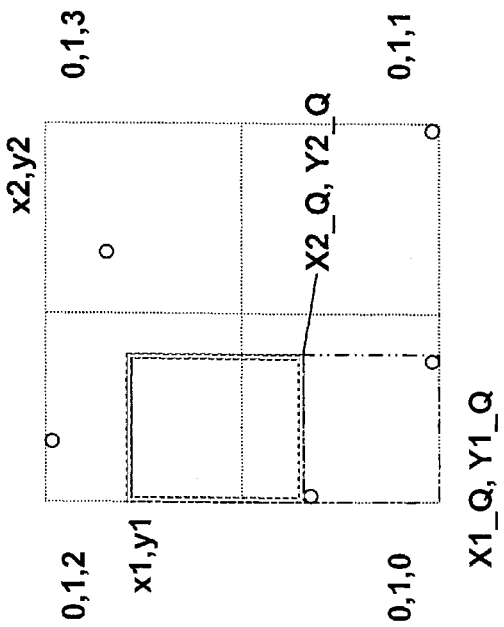
Figure 20a: Pre-S13.2 - cropped region of interest wrt sub quad 0,1,0
Figure 20b: Post S13.2 - cropped region of interest wrt sub quad 0,1,0
S13.1 Retrieve sub quad 0,1,0 from database
S13.2 Check size of region of interest:
X2> X2_Q & y2 > Y2_Q
SO CROP REGION OF INTEREST -
Set x2=X2_Q and y2=Y2_Q
S13.3 conditions are satisfied (which means no overlap so no points in the region of interest)
S13.6 i++; i is <3 so retrieve sub quad 0,1,1
See figure 21

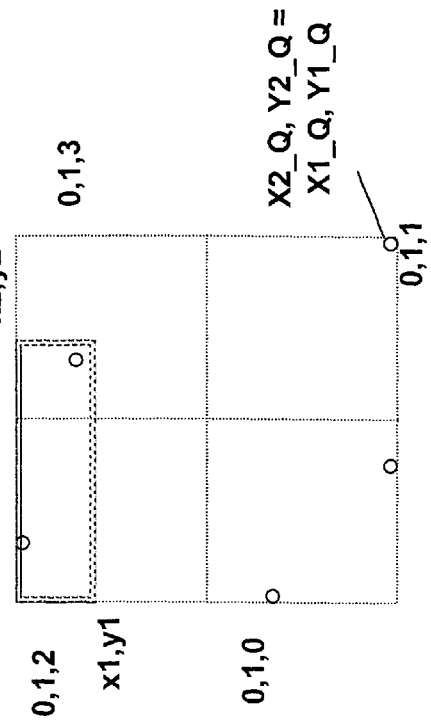

Figure 21a: Pre-S13.2 - cropped region of interest wrt sub quad 0,1,1

S13.1 Retrieve sub quad 0,1,1 from database

S13.2 Check size of region of interest:

$X1 < X1\_Q$, & $y2 > Y2\_Q$

SO CROP REGION OF INTEREST -

Set $x1 = X1\_Q$ and $y2 = Y2\_Q$

S13.3 conditions are satisfied (which means no overlap so no points in the region of interest)

S13.6 i++; i is <3 so retrieve sub quad 0,1,2

See figure 22

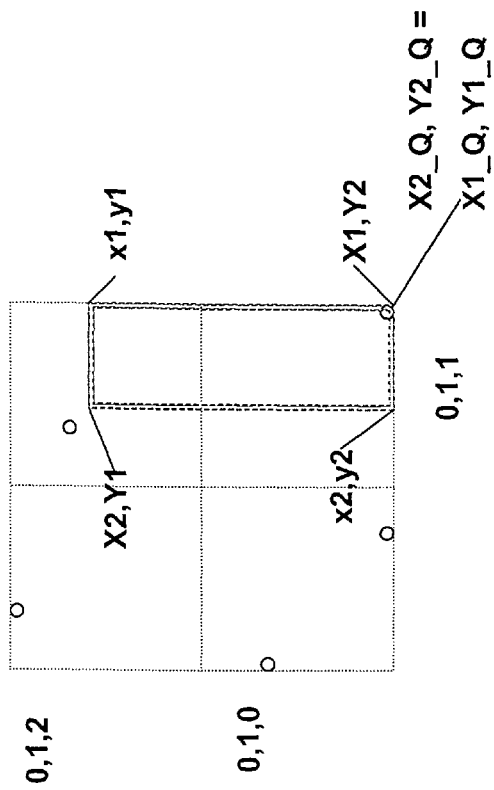

Figure 21b: Post-S13.2 - cropped region of interest wrt sub quad 0,1,1

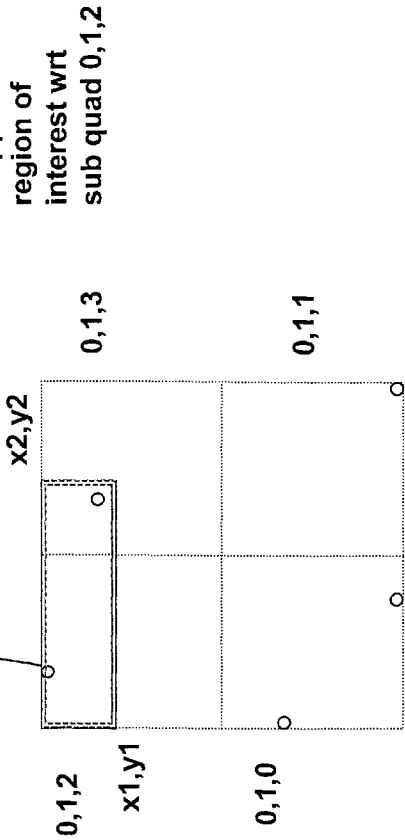
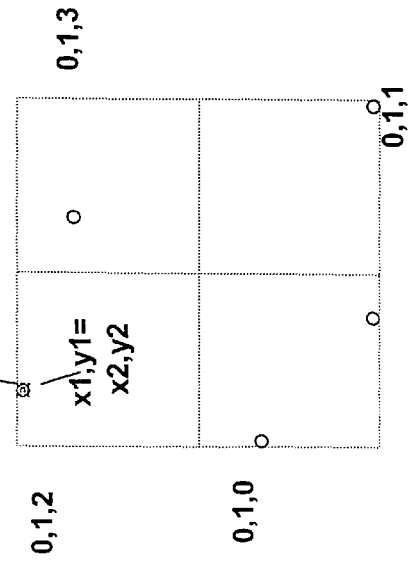

S13.1 Retrieve sub quad 0,1,2 from database

S13.2 Check size of region of interest:

X1<X1_Q & X2>X2_Q, & y1 < Y1_Q & y2>Y2_Q

SO CROP REGION OF INTEREST -

Set x1=X1_Q, x2 = x2_q, y1=Y1_Q, y2=Y2_Q

S13.3 conditions are not satisfied,

S13.4 conditions are satisfied because there is perfect cover between sub quad and cropped region, S13.4.2 Record quad and point in quad S13.6 i++; i is <3 so retrieve sub quad 0,1,3

See figure 23

Figure 22a: Pre-S13.2 - cropped region of interest wrt sub quad 0,1,2

Figure 22b: Post-S13.2 - cropped region of interest wrt sub quad 0,1,2

Figure 23a: Pre-S13.2 - cropped region of interest wrt sub quad 0,1,3

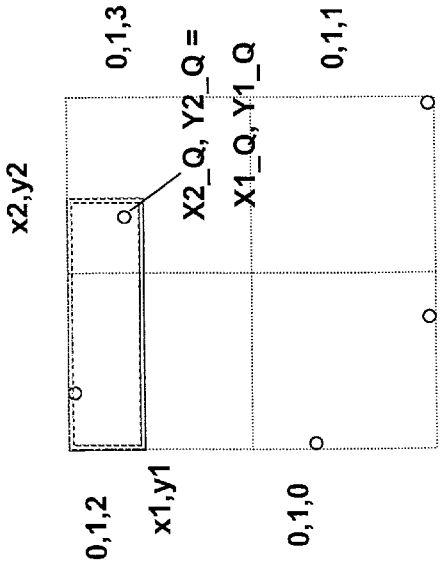

Figure 23b: Post-S13.2 - cropped region of interest wrt sub quad 0,1,3

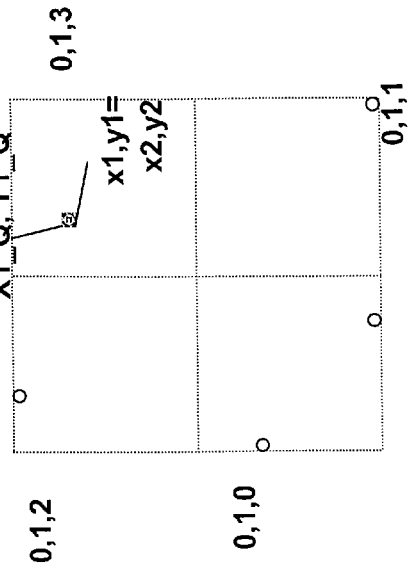

S13.1 Retrieve sub quad 0,1,3 from database

S13.2 Check size of region of interest:

X1<X1_Q & X2>X2_Q, & y1 < Y1_Q & y2>Y2_Q

SO CROP REGION OF INTEREST -

Set x1=X1_Q, x2 = x2_q, y1=Y1_Q, y2=Y2_Q

S13.3 conditions are not satisfied,

S13.4 conditions are satisfied because there is perfect cover between sub quad and cropped region, S13.4.2 Record quad and point in quad S13.6 i++; i is > 3 so retrieve sub quad 0,2

See figure 24

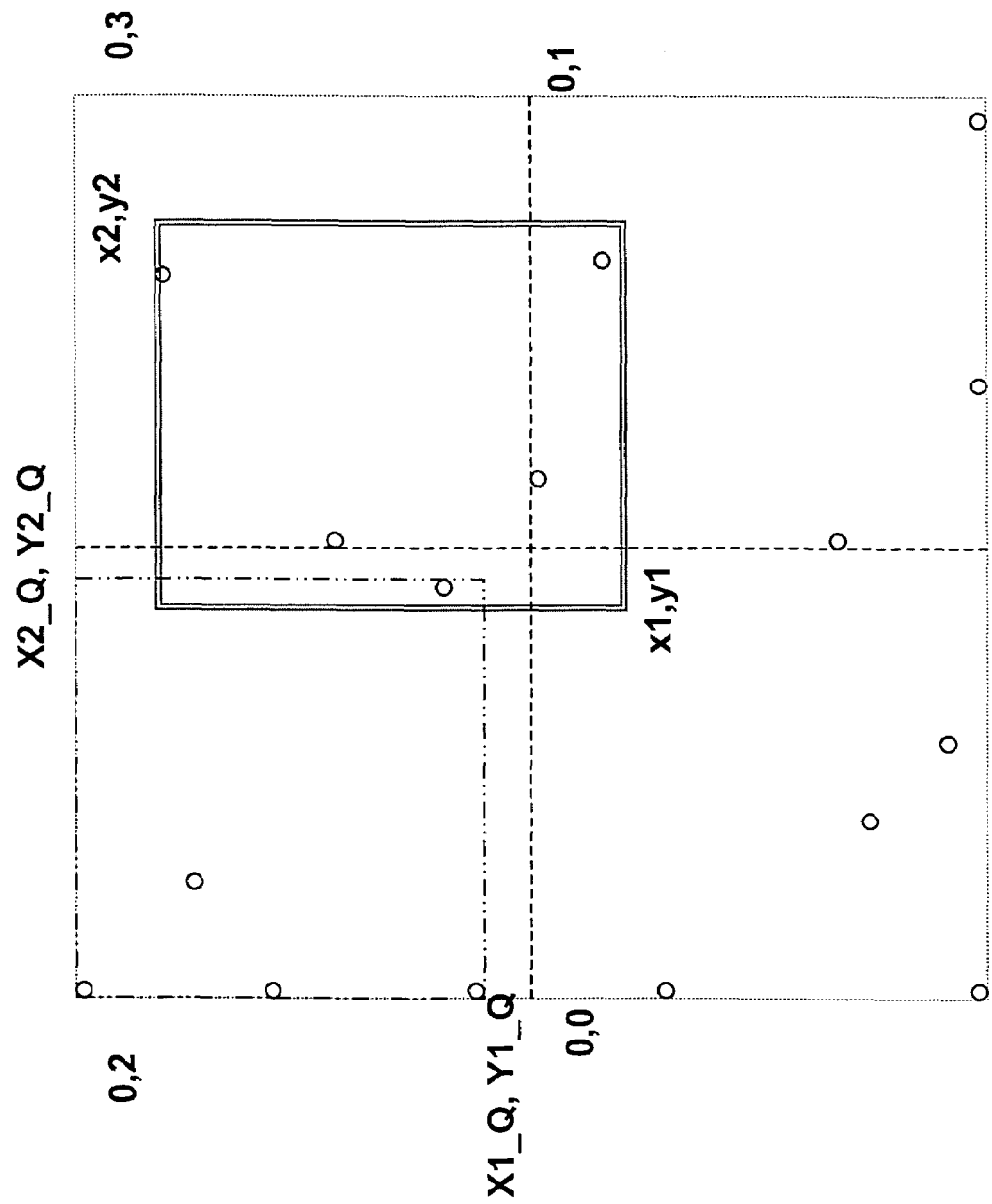
Figure 24: Recall position of region of interest and sub quad 0,2

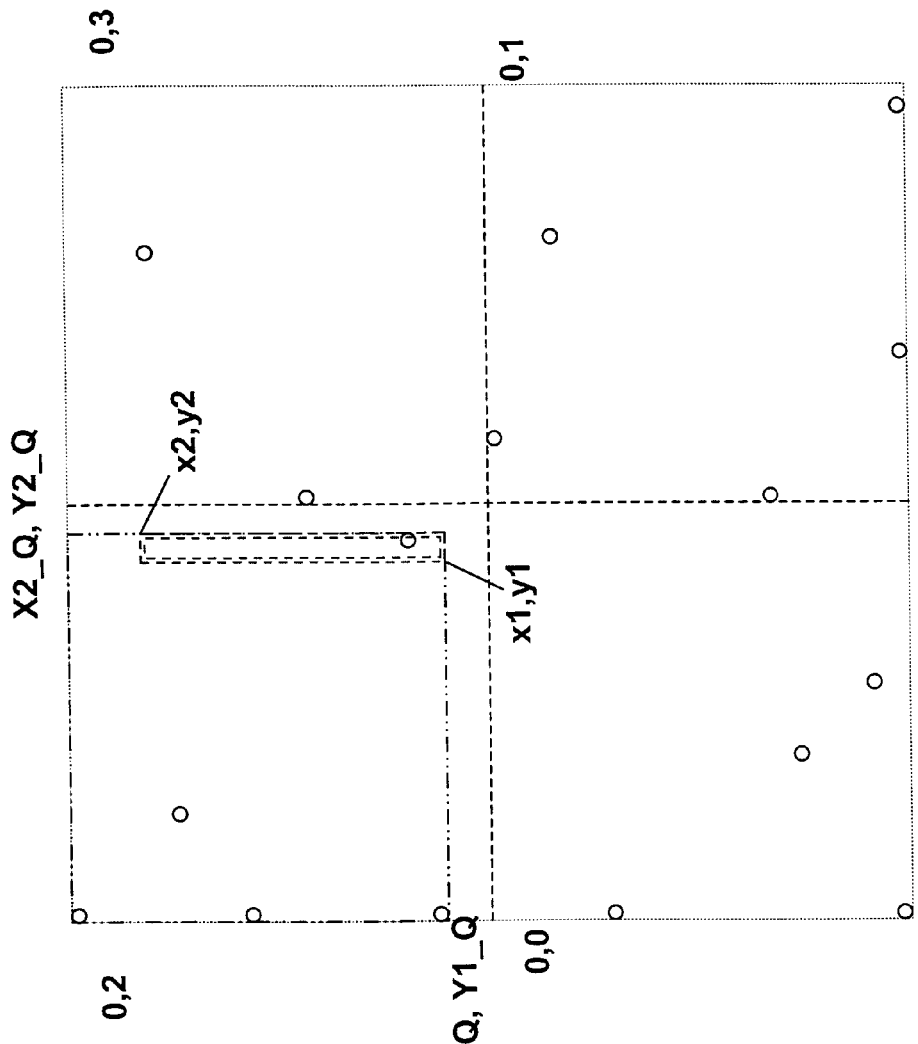
Figure 25 Cropped region of interest in sub-quad 0,2 (figure shows region post S13.2)
S13.1 Retrieve sub quad 0,2 from database
S13.2 Check size of region of interest:
y1< Y1_Q & x2 > X2_Q
SO CROP REGION OF INTEREST -
Set y1=Y1_Q and x2=X2_Q
S13.3 conditions are not satisfied,
S13.4 conditions are not satisfied,
S13.6 retrieve sub quad 0,2,0
See figure 26

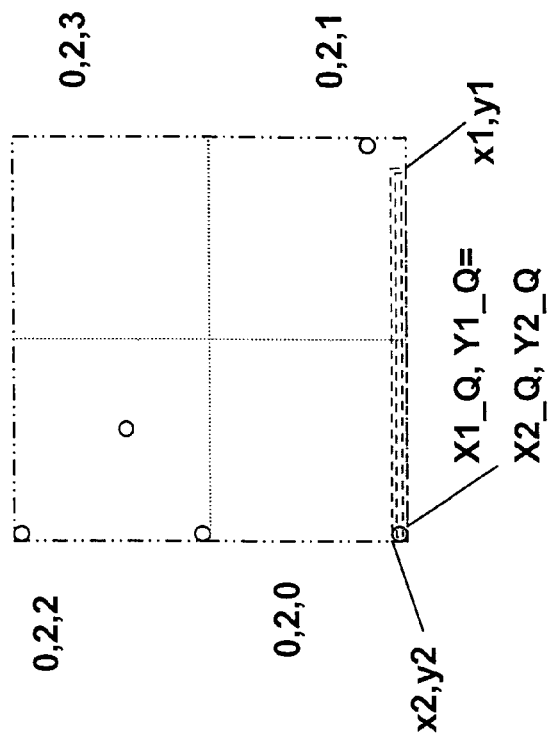
Figure 26b: Post S13.2 - cropped region of interest wrt sub quad 0,2,0
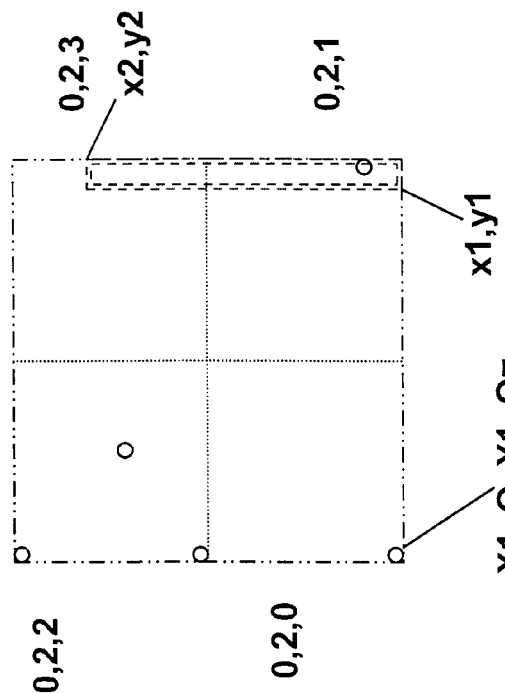
Figure 26a: Pre-S13.2 - cropped region of interest wrt sub quad 0,2,0
S13.1 Retrieve sub quad 0,2,0 from database
S13.2 Check size of region of interest:
X2> X2_Q & y2 > Y2_Q
SO CROP REGION OF INTEREST -
Set x2=X2_Q and y2=Y2_Q
S13.3 conditions are satisfied (which means no overlap so no points in the region of interest)
S13.6 i++; i is <3 so retrieve sub quad 0,2,1
See figure 27

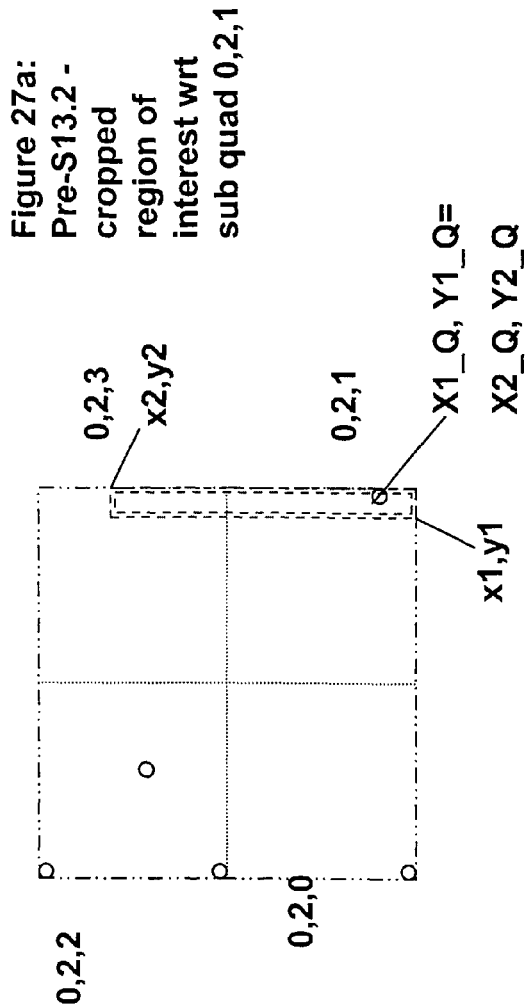
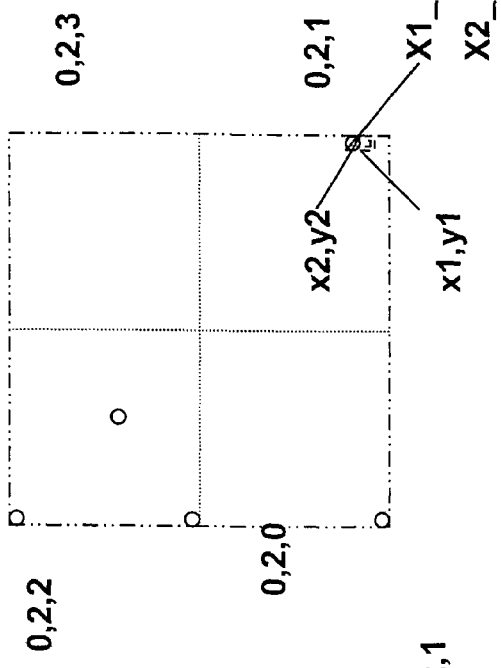

Figure 27a: Pre-S13.2 - cropped region of interest wrt sub quad 0,2,1

Figure 27b: Post-S13.2 - cropped region of interest wrt sub quad 0,2,1

S13.1 Retrieve sub quad 0,2,1 from database

S13.2 Check size of region of interest:

X1<X1_Q & X2>X2_Q, & y1 < Y1_Q & y2>Y2_Q

SO CROP REGION OF INTEREST -

Set x1=X1_Q, x2 = x2_q, y1=Y1_Q, y2=Y2_Q

S13.3 conditions are not satisfied,

S13.4 conditions are satisfied because there is perfect cover between sub quad and cropped region, S13.4.2 Record quad and point in quad S13.6 i++; i is < 3 so retrieve sub quad 0,2,2

See figure 28

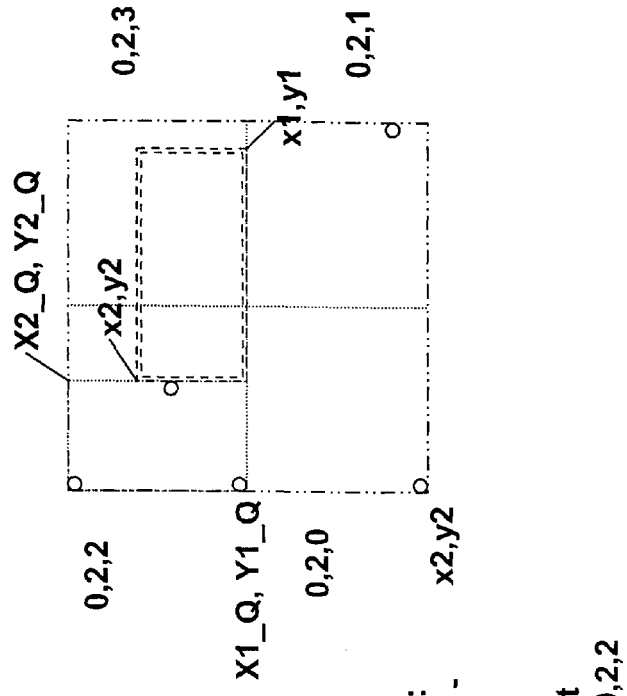
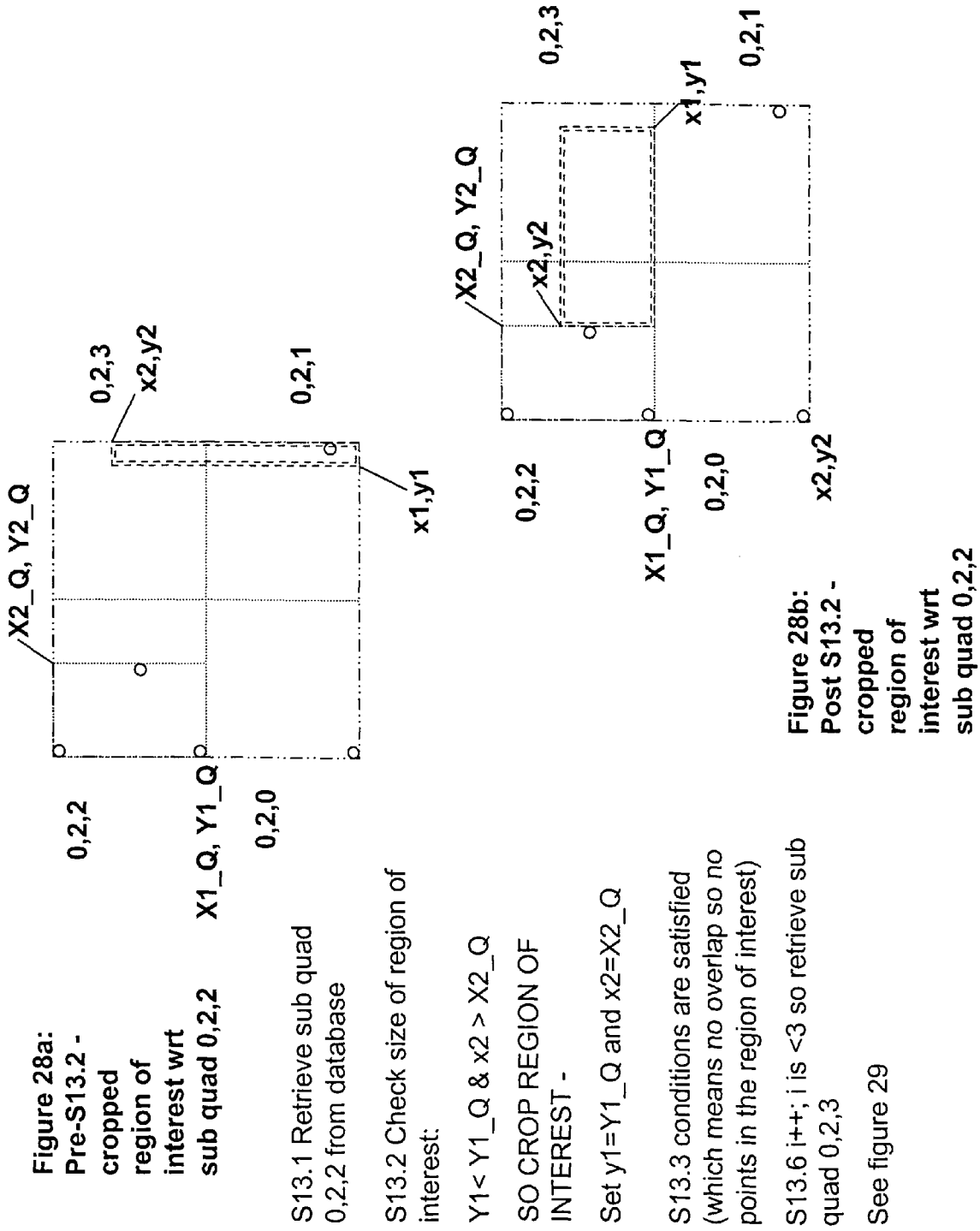
Figure 28a: Pre-S13.2 - cropped region of interest wrt sub quad 0,2,2
S13.1 Retrieve sub quad 0,2,2 from database
S13.2 Check size of region of interest:
Y1<Y1_Q & x2 > X2_Q
SO CROP REGION OF INTEREST -
Set y1=Y1_Q and x2=X2_Q
S13.3 conditions are satisfied (which means no overlap so no points in the region of interest)
S13.6 i++; i is <3 so retrieve sub quad 0,2,3
See figure 29
Figure 28b: Post S13.2 - cropped region of interest wrt sub quad 0,2,2 analysis wrt
sub quad 0,2,3**

S13.1 Retrieve sub quad 0,2,3 from database: NO QUAD at this level so

S13.6.2: retrieve quad 0,3

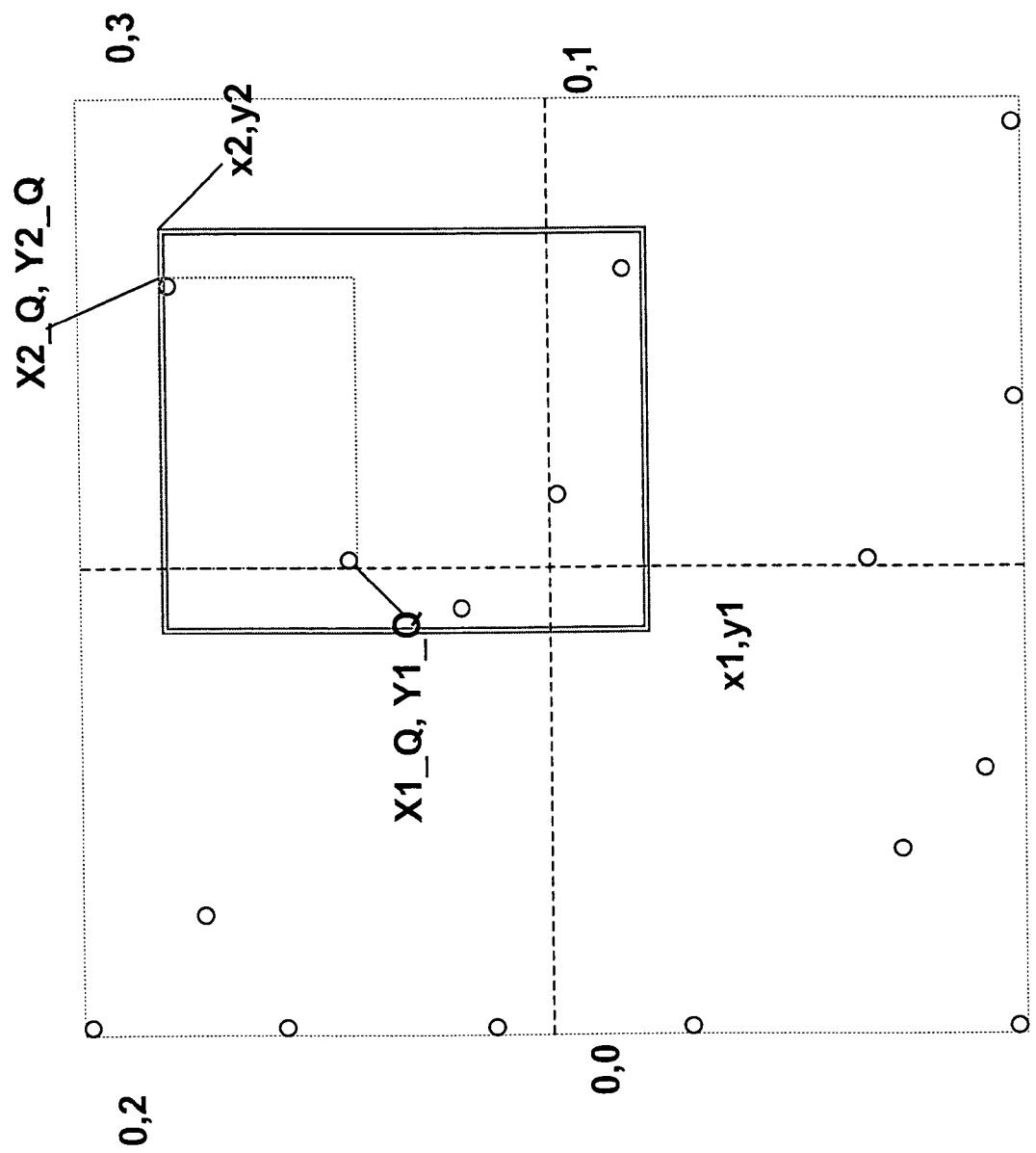
Figure 30: Recall position of region of interest and sub quad 0,3

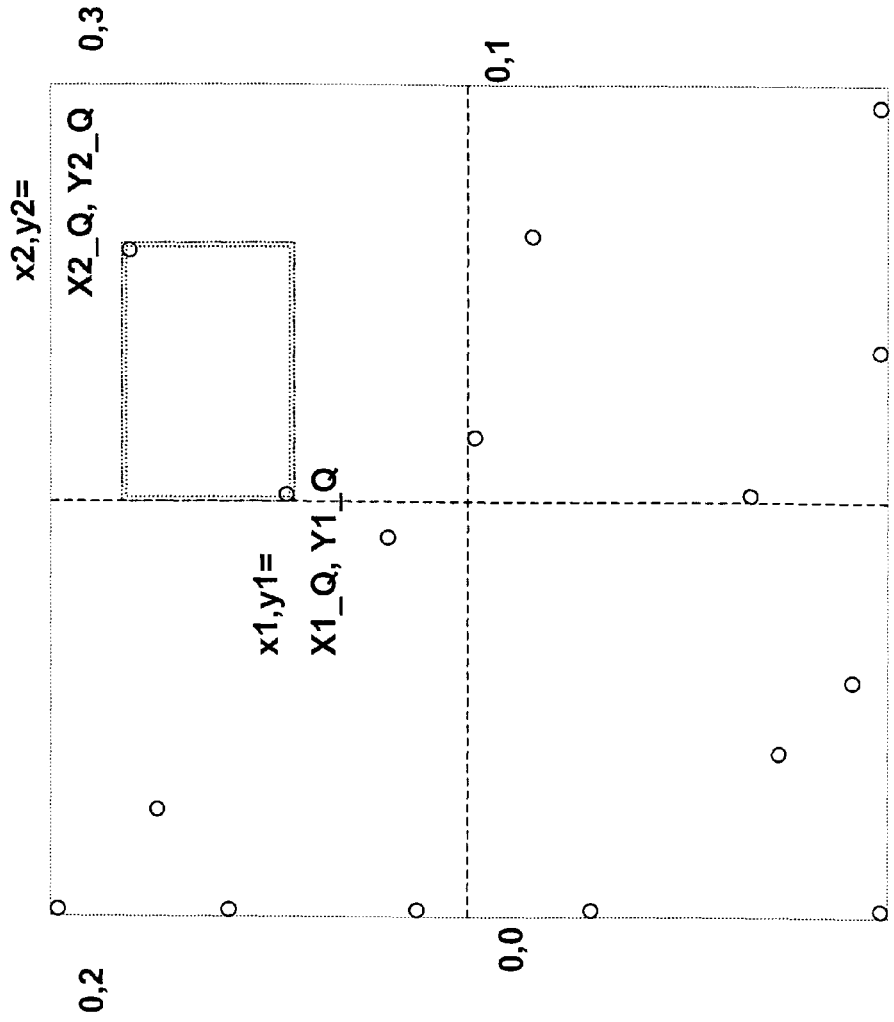

Figure 31 Cropped region of interest in sub-quad 0,3 (figure shows region post S13.2)

S13.1 Retrieve sub quad 0,3 from database

S13.2 Check size of region of interest:

x1< X1_Q & y1<Y1_Q & x2 > X2_Q & y2>Y2_Q

SO CROP REGION OF INTEREST -

Set x1=X1_Q, x2 = x2_q, y1=Y1_Q, y2=Y2_Q

S13.3 conditions are not satisfied,

S13.4 conditions are satisfied,

S13.4.2 Record quad and points in quad

S13.6 i++; i is > 3 so retrieve sub quad 1

For sub quad 1 (and 2&3), repeat steps shown above for sub quad 0, but note that the region of interest does not fall within any of the other quads

METHOD OF RETRIEVING ENTITIES

This application is the US national phase of international application PCT/GB01/05479 filed 11 Dec. 2001 which designated the U.S.

BACKGROUND

1. Technical Field

The present invention relates to a method of retrieval, and is suitable for use with entities stored in a database, or equivalent storage.

2. Related Art

It can readily be seen that when there are vast numbers of entities in a database, identifying entities in accordance with a query in respect of data in the database within a reasonable period of time is a non-trivial exercise. To ease the retrieval process, data in a database is generally indexed in some way, and queries are then performed on the index. The way in which the entities are indexed can be expected to have a significant bearing on the quality and speed of retrieval, and as information is increasingly being stored in databases, there is significant interest in finding improved ways of indexing data.

It is known to index location data based on place names. It is also known to retrieve a set of geographic coordinates from place names, and build an index based on topological information extracted from the coordinates (e.g. "GIPSY": developed at U.C. Berkeley in conjunction with a joint NSF/NASA/ARPA (Wilensky et al., 1994) initiative). Furthermore, it is known to build an index based on the geographical coordinates themselves: database vendors such as Oracle™ have developed systems for storing and indexing geometrical data—e.g. Oracle spatial data cartridge, which allows a spatial querying to be carried out using an extended (non-standard) form of SQL. Other vendors, like MapInfo™, SpatialWare™, Innogistic™ and Informix™ have similar proprietary ways of dealing with spatial data. In particular, Innogistic™ have developed a product known as Cartology DSI, which stores geometrical vector data as blobs (binary large objects—which are not intrinsically recognisable by the underlying database). It also creates indexes outside of the database based on the well-known 'quad tree' idea. The index data is stored in binary-tree structures and is accessed by Distributed Component Object Model (DCOM) middleware services.

Both the Oracle™ and lnnogistic™ systems make use of the quad-tree method, in which an entire area of a layer is divided and subdivided into a series of four nested squares. The entire area is assigned to one of four squares designated 0, 1, 2, and 3. Each of these squares is subdivided into four smaller squares. The area of square 1 becomes 10, 11, 12, and 13. Each of these is further subdivided, meaning, for example, that the subdivisions of square 11 would be assigned index values of 110, 111, 112, and 113. As a result, any location in the map can be referred to by a single index number. The disadvantage with this quad-tree method is that processing time is wasted if there are no points within the subdivided squares; if indexing is performed over a large area, this wasted processing time is non-trivial and costly.

BRIEF SUMMARY

According to a first aspect of the present invention there is provided a method of retrieving points that are contained within a predetermined area. The method comprises (i) retrieving data identifying a region, where the region encompasses one or more points and is associated with linking data which, for each region, identifies the point or points encompassed by that region;

(ii) performing a process in respect of the region, the process comprising the steps of:

comparing extents of the region with extents of the predetermined area in order to establish whether the region overlaps with the predetermined area;

if there is overlap, retrieving data identifying sub-regions of the region and identifying any such sub-regions whose extents are wholly within the predetermined area;

(iii) for each sub-region, repeating the process until all sub-regions thereof falling wholly within the predetermined area are identified, and (iv) accessing linking data corresponding to the identified sub-regions so as to retrieve points encompassed by the sub-regions.

The plurality of points is advantageously pre-stored as a list of points, in an order given by the predetermined relationship between the region and sub-regions. Furthermore the linking data includes a value indicating the position of a first of the corresponding encompassed points in the list of points. The accessing step then involves retrieving an identifier representative of the number of encompassed points and retrieving the position value associated with the identified region or sub-region. This enables retrieval of the number of encompassed points from a position in the list associated with the position value.

Conveniently the points correspond to data that can be expressed in two dimensions, for example location (longitude and latitude) data or range data. Range data can include business hours (e.g. opening and closing times), price margins (e.g. maximum and minimum prices), and/or medical data (e.g. maximum and minimum blood pressure). Thus a predetermined area could be a range of prices—such as a maximum house prices and a minimum house price. In accordance with the method described above, the extents of the predetermined area (i.e. price range) are compared with a region retrieved from the index. All regions that overlap with the price range are then successively retrieved until a region, which falls wholly within the specified price range, is identified. All points falling within this identified region thus represent goods being of a price that falls within the specified maximum and minimum price range.

BRIEF DESCRIPTION OF THE DRAWINGS

Further aspects, features and advantages of the present invention will be apparent from the following description of preferred embodiments of the invention, which refers to the accompanying drawings, in which

FIG. 3 is a schematic diagram showing an expanded view of FIG. 2;

FIG. 12 is a schematic diagram illustrating a process of storing points according to the invention;

FIGS. 13a & 13b in combination comprise a flow diagram showing an embodiment of a retrieving process according to the present invention when retrieving points in accordance with an area of interest;

FIGS. 16 and 17 are an enlarged view of FIG. 15 and are schematic diagrams showing application of the process of FIGS. 13a & 13b to a first of the sub-quads of FIG. 7;

FIGS. 20a & 20b are schematic diagrams showing application of the process of FIGS. 13a & 13b to a (first) sub-quad of the sub-quad shown in FIG. 18;

FIGS. 21a & 21b are schematic diagrams showing application of the process of FIGS. 13a & 13b to another (a second) sub-quad of the sub-quad shown in FIG. 18;

FIGS. 22a & 22b are schematic diagrams showing application of the process of FIGS. 13a & 13b to another sub-quad (a third) of the sub-quad shown in FIG. 18;

FIGS. 23a & 23b are schematic diagrams showing application of the process of FIGS. 13a & 13b to another sub-quad (a fourth) of the sub-quad shown in FIG. 18;

FIG. 24 is an enlarged view of FIG. 15 and shows the area of interest and a third of the sub-quads of FIG. 7;

FIG. 25 is a schematic diagram corresponding to FIG. 24 showing application of the process of FIGS. 13a & 13b to the third of the sub-quads of FIG. 7;

FIGS. 26a & 26b are schematic diagrams showing application of the process of FIGS. 13a & 13b to a (first) sub-quad of the sub-quad shown in FIG. 24;

FIGS. 27a & 27b are schematic diagrams showing application of the process of FIGS. 13a & 13b to another (a second) sub-quad of the sub-quad shown in FIG. 24;

FIGS. 28a & 28b are schematic diagrams showing application of the process of FIGS. 13a & 13b to another sub-quad (a third) of the sub-quad shown in FIG. 24;

FIG. 30 is an enlarged view of FIG. 15 and shows the area of interest and a fourth of the sub-quads of FIG. 7;

FIG. 31 is a schematic diagram corresponding to FIG. 30 showing application of the process of FIGS. 13a & 13b to the fourth of the sub-quads of FIG. 7;

DETAILED DESCRIPTION OF EXEMPLARY EMBODIMENTS

Overview

Figure 1:
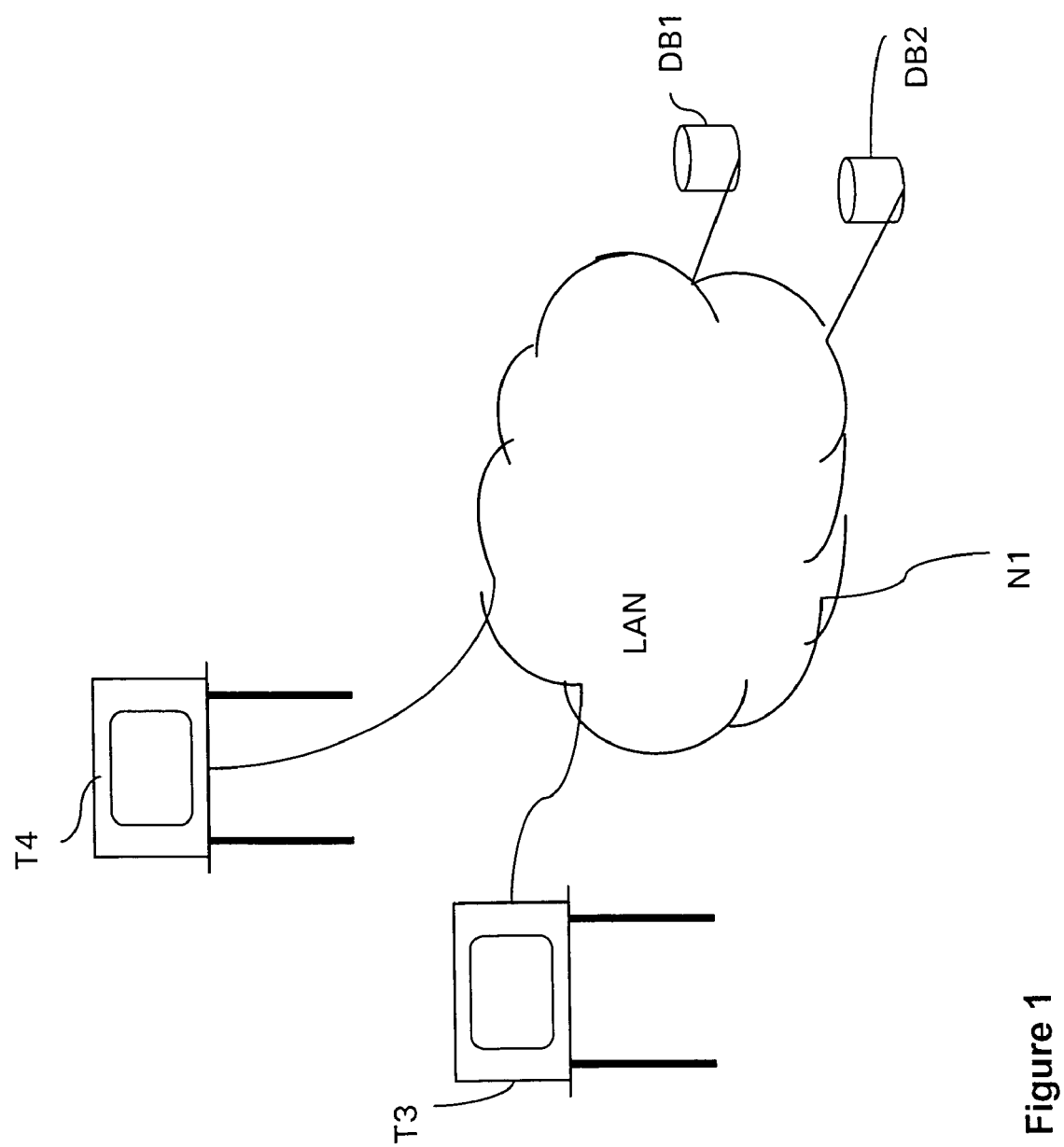
FIG. 1 is a schematic diagram illustrating aspects of a communications system used by the invention.

Database servers DB1, DB2, such as those shown in FIG. 1, typically store information for retrieval by users. At the physical level, the communications environment within which the database servers DB1, DB2 are located includes at least one user interface, commonly provided by a computer terminal or workstation T3.

Embodiments of the invention can be executed on the workstation T3, which is connected to database servers DB1, DB2. Although the database servers DB1, DB2 are shown on the same LAN N1 as the terminal T3, it is understood that the database servers DB1, DB2 could be connected to different networks, which in turn are connected to LAN N1 via one or more switches and/or routers (not shown). Embodiments receive data as input, for instance as a file, and build an index to the data, as is described in more detail below. The built index is then saved in one of the databases DB1, DB2, and the indexed data is also saved, in an order given by the structure of the built index, to one of the databases DB1, DB2. The built index can be saved on the same, or a different, database as the database on which the data is stored.

Embodiments of the present invention are concerned with indexing entities that are defined by 2-dimensions. Obvious examples of entities that can be indexed according to embodiments include the location of objects, such as petrol stations, cash points etc., as the position of objects is commonly defined in terms of latitude and longitude. Many other entities can be represented by 2-dimensions—e.g. acceleration of a motorbike as a function of time and speed, conductivity of a material as a function of material properties and temperature, deformation of an object as a function of material properties and force applied to the object etc. Furthermore, transformations can be applied to n-dimensional parameters to reduce them to 2-dimensional parameters, which can be displayed in a 2-dimensional space.

A further example of entities that can be indexed using embodiments of the present invention include range information, e.g. temporal information, price information, and medical condition information.

An example of temporal range information is opening and closing times of business and leisure establishments—these times can be expressed in two dimensions, with, for example, the closing and opening times respectively on the ordinate and abscissa axes. Similarly, delivery times (earliest and latest) can be expressed in two dimensions.

An example of price information includes prices of goods, so that, for example, maximum and minimum prices of goods can be respectively expressed on one of two dimensions, and so indexed using embodiments of the invention. Price information also includes trading information, as used to buy and sell stocks, shares, bonds etc.

An example of medical condition information includes statistics relating to measurable conditions such as body temperature and blood pressure, and conditions that can be translated into numerical representations, such as cancer sites.

In the following description, entities are generally referred to as "points" in order to disassociate the context of the entities (e.g. petrol station, cash point etc.) from the mechanics of the embodiment.

Figure 2:
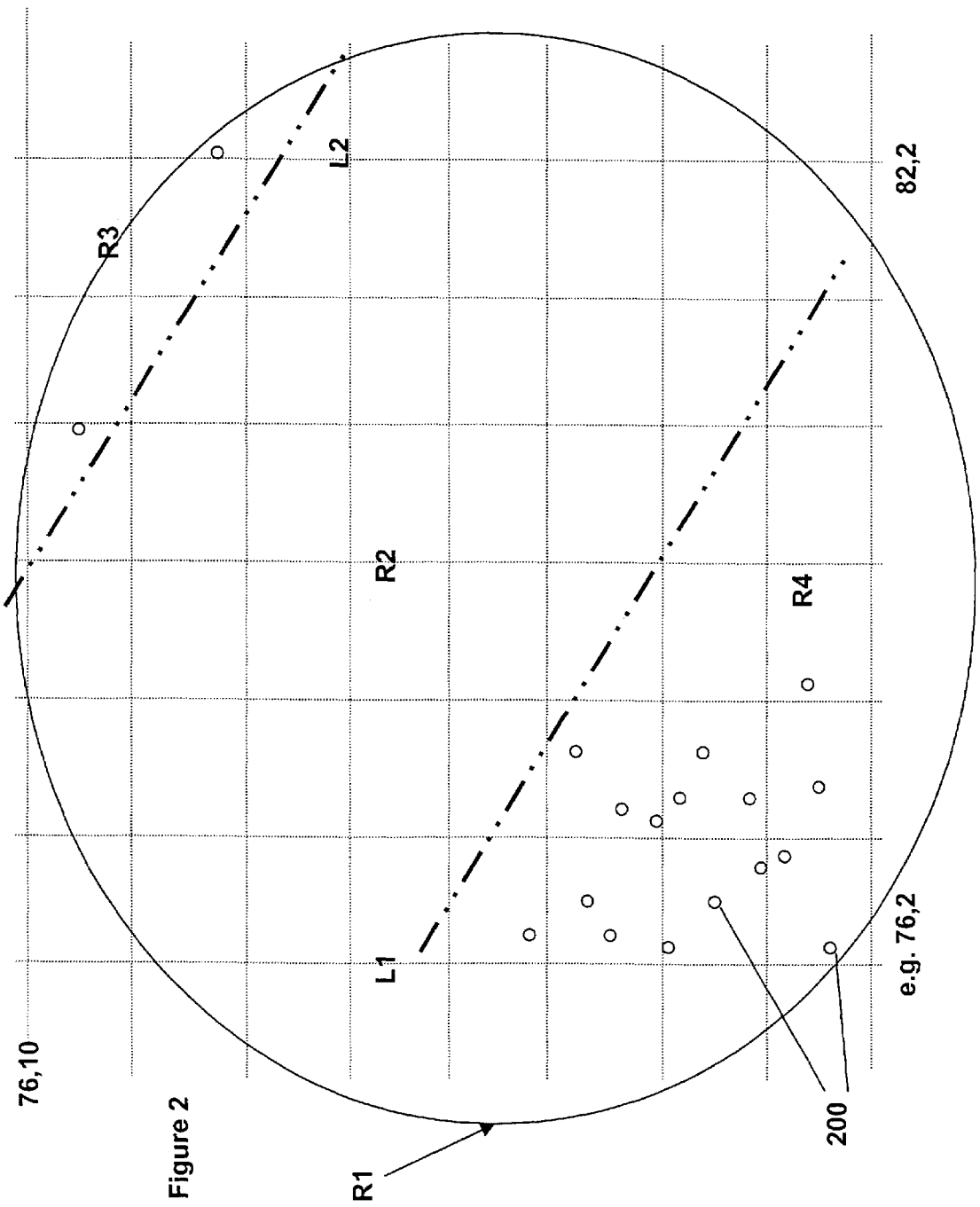
FIG. 2 is a schematic diagram showing an example of points to be indexed according to the invention.

In overview, an embodiment of a method of indexing points is described with reference to FIG. 2. FIG. 2 shows an area R1 within which a plurality of points 200 is located. Each of the points is defined in x,y co-ordinate space. Essentially the area R1 comprising points to be indexed is examined and split into areas R3, R4 containing points and area R2 not containing points (the areas could be split into any shape, such as a rectangle, triangle, or strips; FIG. 2 shows the areas split into strips for the purposes of describing the inventive concept of this invention). The embodiment then examines the distribution of points in areas R3 and R4, identifying on a smaller scale than was considered for region R1, areas in R3 and R4 that comprise points. Referring to FIG. 3, R4 essentially becomes R11 and the distribution of points within R11 is examined. By concentrating on the distribution of points in this way, areas that do not contain any points, Region R2 in FIG. 2 and region R12 in FIG. 3 are implicitly discarded. The process is continually repeated, effectively "burrowing down" through a series of areas of diminishing size, until the size of an area is such that it collapses to the size of a single point. As the embodiment "burrows down", each area is linked to the area above it, such that each point is linked by a series of areas. An index to these points comprises the series of areas, and these areas and points are used to create an index (described in more detail below) that is saved in database DB1. The relationship between the points and areas enables points to be identified by identification of an area in the index.

One of the advantages of creating an index as described above is that the query search domain is confined to areas that are known to contain points—i.e. queries will only be carried out on the areas saved in the database DB1, and as these areas by definition include points, the search domain is relatively compact. Referring back to FIG. 2, the process of identifying points in respect of a query is faster according to the embodiment described above, than if the index comprised information relating to the whole of area R1.

In a particular form of an embodiment, presented below with reference to FIGS. 4-11, points are 2-dimensional co-ordinates in x, y space. If the entities to be indexed are acceleration values, defined by a corresponding set of time and speed values, the time and speed values map directly onto an x,y co-ordinate space, so that (t1, v1), (t2, v2) . . . (tn, vn) are co-ordinates of points corresponding to the acceleration values. Similarly, if the entities to be indexed are location values, defined by a corresponding set of latitude and longitude values, the latitude and longitude values map directly onto an x, y co-ordinate space, such that (lat_1, long_1) . . . (lat_n, long_n) are co-ordinates of points corresponding to location values. It is assumed that the points have been stored (e.g. written to a file), so that embodiments of the invention read the points in from a file. In alternative embodiments a user may input the points when the index to those points is about to be built.

Furthermore, in the embodiment presented below, the areas are squares, referred to as "quads" and "sub-quads" in the description below, and each quad is successively split into four sub-quads. Each sub-quad is examined for the existence of points. Those with no points are discarded, which is an equivalent process to discarding the area R2 described with reference to FIGS. 2 and 3 above, and each new sub-quad containing points is "shrunk wrapped" around the smallest area that contains points in that sub-quad. (The embodiment analyses the areas in accordance with squares, but many other shapes could be used to "shrink-wrap" around the points). Each sub-quad is then divided again into four sub-quads, empty sub-quads are again discarded and each remaining sub-quad "shrunk-wrapped" about its smallest area containing points. Eventually, each remaining sub-quad will have been "shrunk-wrapped" onto a single point and its co-ordinates will be those of the point concerned. Once the quad and all the sub-quads, including both the intervening sub quads which haven't been discarded and the sub-quads coinciding with single points, have been identified, an index to the points, comprising the quad and sub quads relevant to each one, is created. This is described in detail after the discussion of FIGS. 5-10.

Figure 4A:
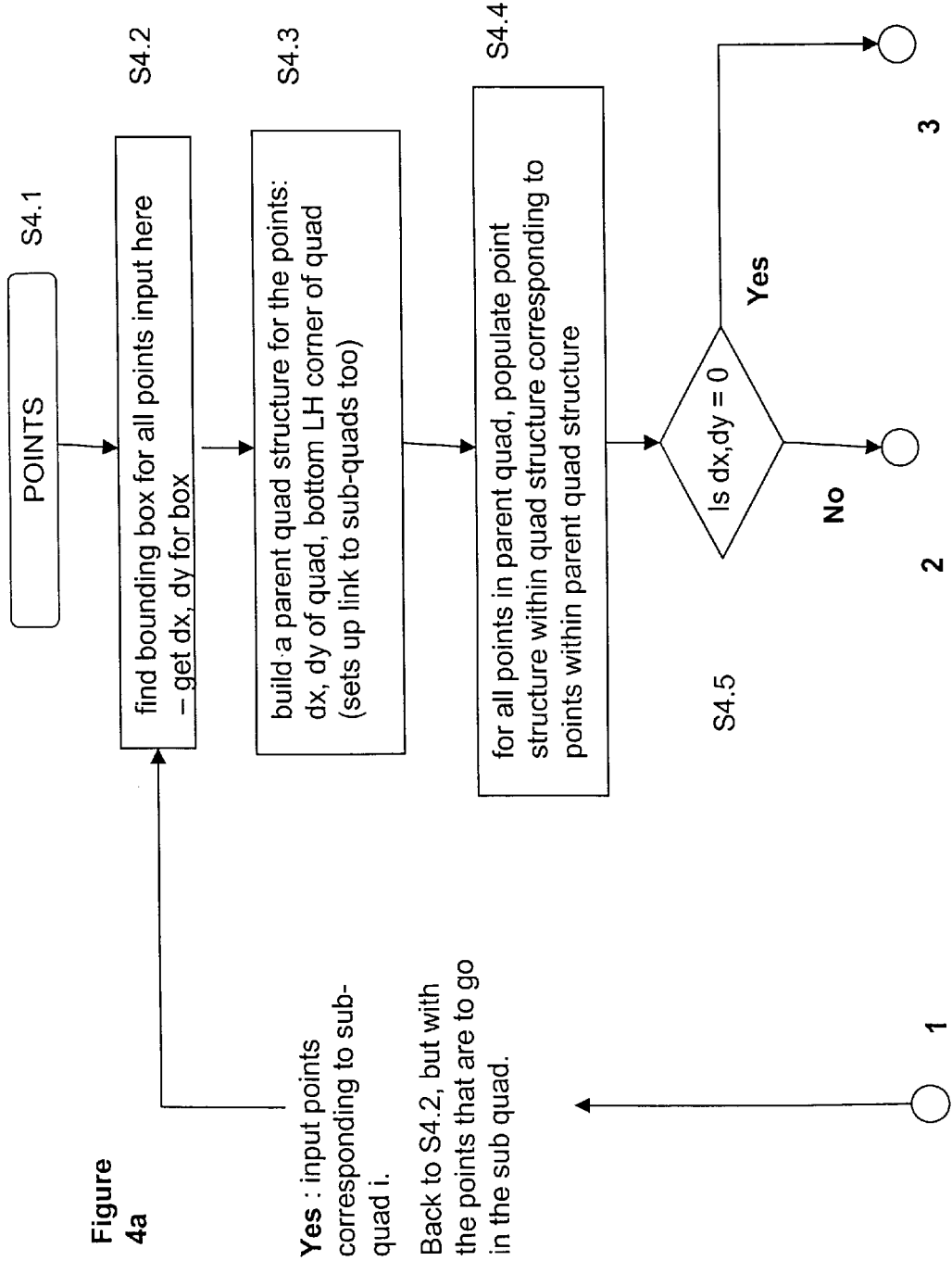
FIGS. 4a & 4b in combination comprise a flow diagram showing an embodiment of an indexing process according to the present invention when indexing the points shown in FIG. 2.
Figure 4B:
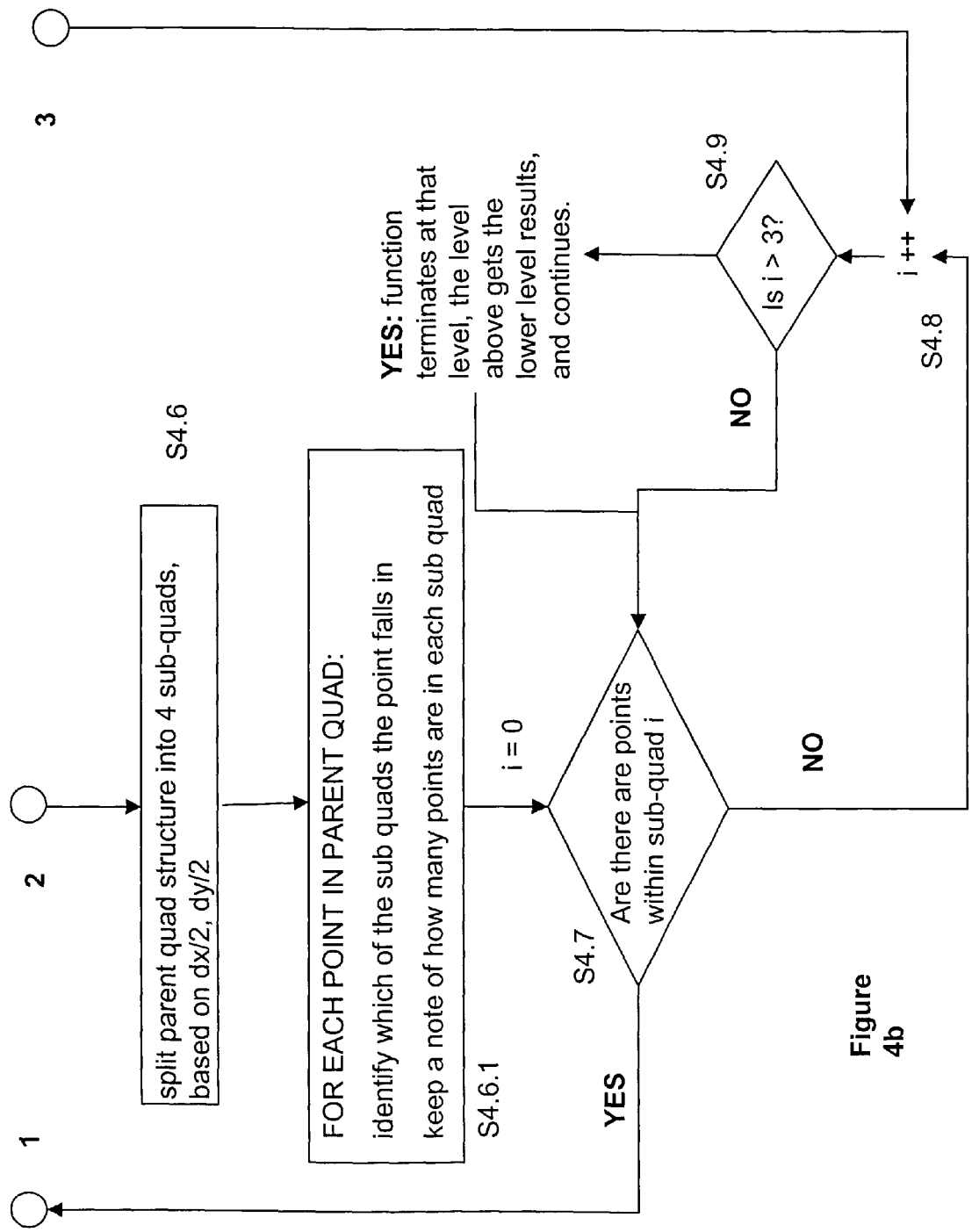

In the following, steps S4.1 through to S4.9 are shown in sequence in the flow chart of FIGS. 4*a* and 4*b* and illustrated by the operations with the same reference numerals as shown in FIGS. 5-11.

FIG. 5

Figure 5:
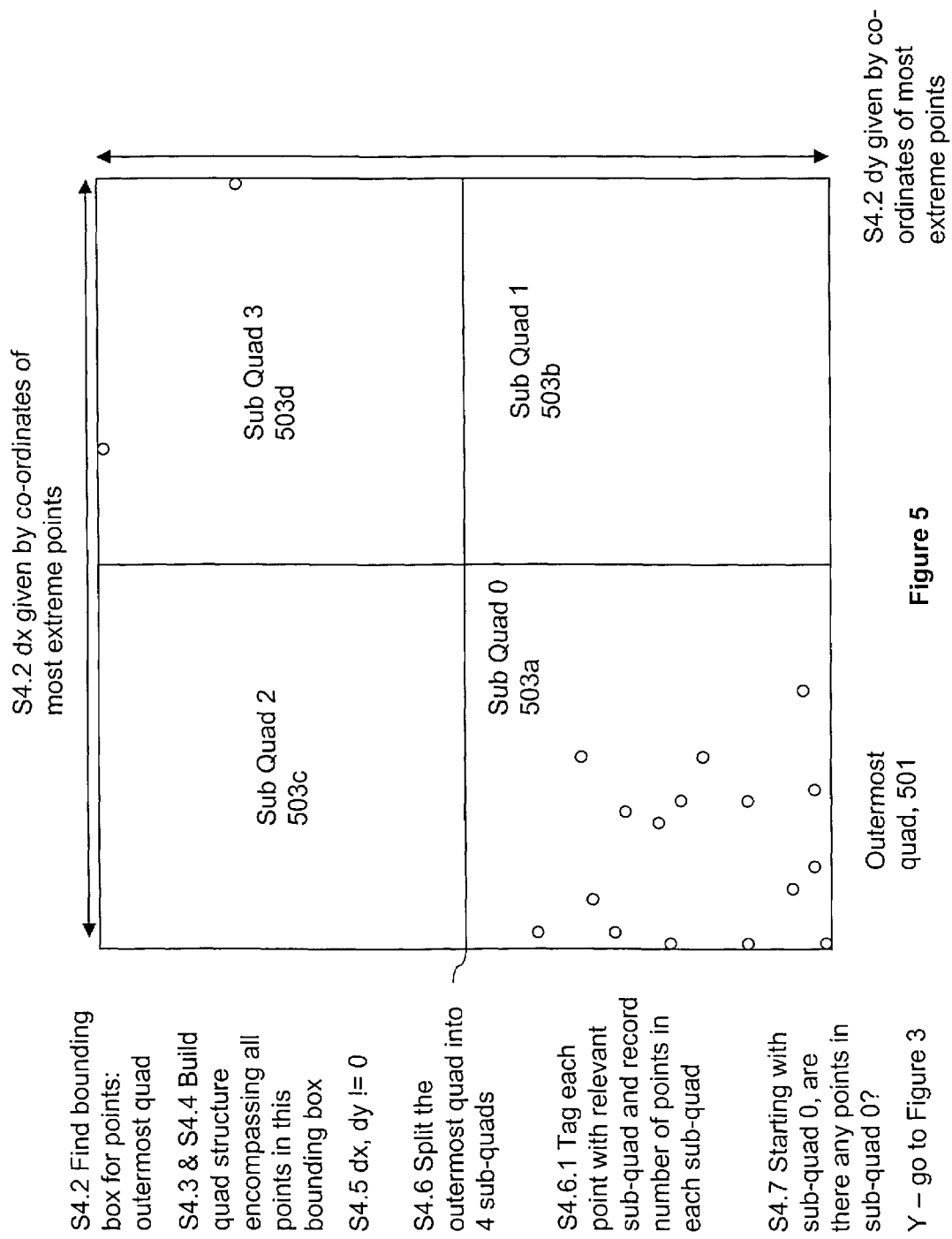
FIG. 5 is a schematic diagram showing application of the process of FIGS. 4a & 4b to create a quad around the points shown in FIG. 2.

Step S4.1 Read in x, y co-ordinates of all points to be indexed (as stated above, the points may be read from either a storage location, such as a file, or directly from a user);

Step S4.2 Draw up a bounding box for all points, identifying, and "shrink-wrapping" around, the co-ordinates of the outermost points (the bounding box is given by the difference between the co-ordinates of the outermost points in both the x and y dimensions: dx and dy respectively). This bounding box is the outermost quad 501;

Step S4.3 & Step S4.4 Save extents of quad 501—i.e. dx, dy—and the co-ordinates of the points in it;

Step S4.5 Check whether the outermost quad 501 has positive size (i.e. are dx, dy of quad 501 equal to zero?) In the example shown in FIG. 5, there is an outermost quad 501, because the quad has multiple points in it, dx, dy are non-zero, and thus quad 501 has positive size;

Step S4.6 Split the outermost quad 501 into four sub-quads, 503*a*, 503*b*, 503*c*, 503*d*;

Step S4.6.1 Tag each point with its relevant sub-quad and record the number of points in each sub-quad;

Step S4.7 Starting with sub-quad 0 (503*a*) check whether there are any points in the sub-quad 503*a*.

As there are points, input the points within this sub-quad 0 (503*a*) to Step S4.1 and run through steps Step S4.1 onwards for sub-quad 0 (503*a*), as described below with reference to FIG. 6.

FIG. 6

Figure 6:
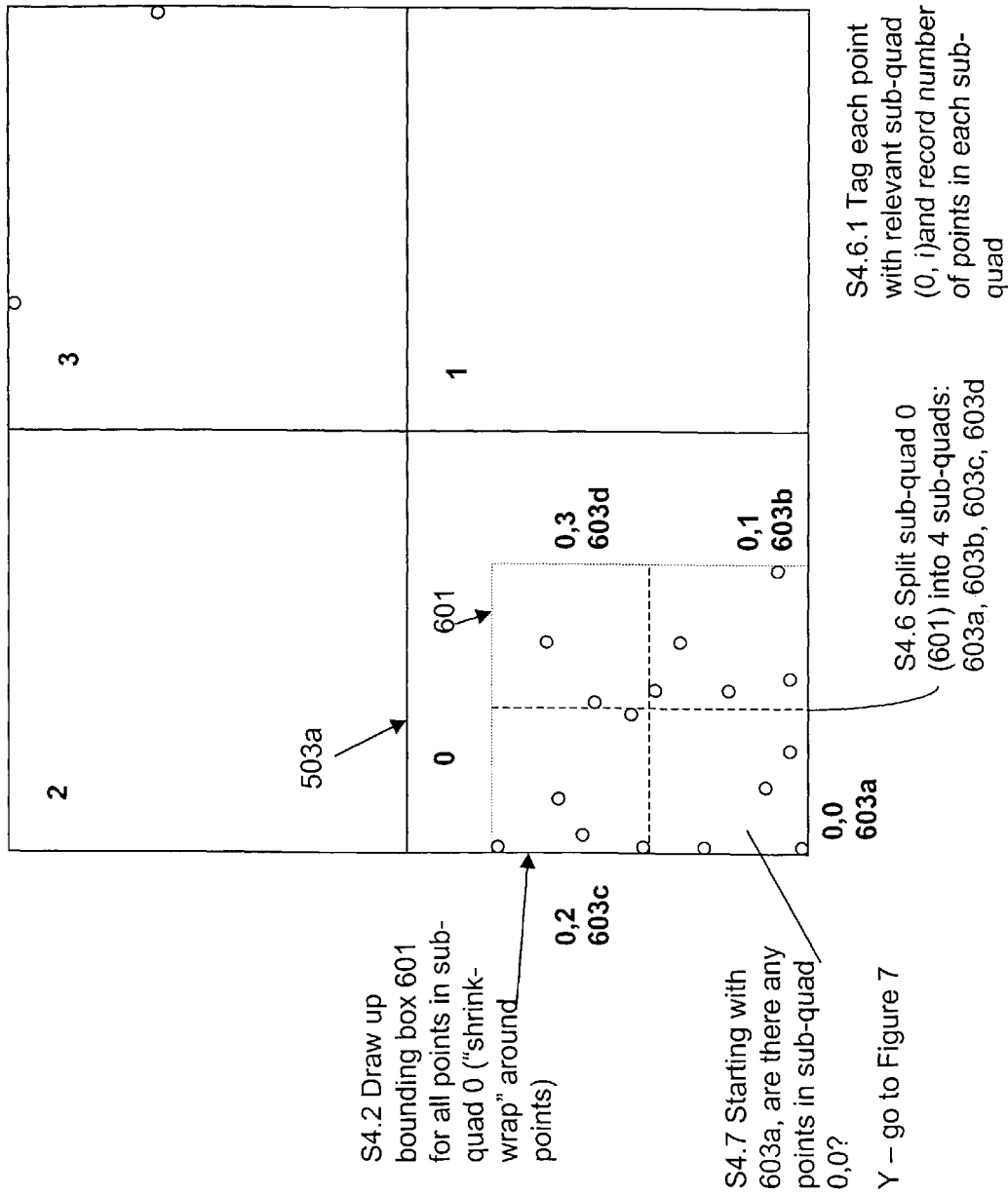
FIG. 6 is a schematic diagram showing application of the process of FIGS. 4a & 4b to create a sub-quad of the quad created according to FIG. 5.

Step S4.1 Read in x, y co-ordinates of points corresponding to sub-quad 503*a*;

Step S4.2 Draw up bounding box for all points in 503*a*, creating "shrink-wrapped" sub-quad 0 601. This illustrates the principle described above—the embodiment identifies an area within sub-quad 0 where there are no points, and this area is then discarded;

Step S4.3 & Step S4.4 Save extents of sub-quad 0 (601)— i.e. dx, dy—and the co-ordinates of points in it;

Step S4.5 Check whether sub-quad 601 has positive size? (i.e. are dx, dy of quad 601 equal to zero?) As can be seen in FIG. 6, quad 601 has multiple points in it, dx, dy for quad 601 are non-zero, and thus sub-quad 601 has positive size;

Step S4.6 Split sub-quad 0 601 into 4 sub-quads: 0,0 (603*a*), 0,1 (603*b*), 0,2 (603*c*), 0,3 (603*d*)

Step S4.6.1 Tag each point with its relevant sub-quad and record the number of points in each sub-quad;

Step S4.7 Starting with sub-quad 0,0 (603*a*) Check whether there are any points in the sub-quad 0,0 (603*a*): As there are points, input the points within this sub-quad 0,0 (603*a*) to Step S4.1 and run through steps Step S4.1 onwards for sub-quad 0,0 (603*a*), as described below with reference to FIG. 7.

FIG. 7

Step S4.1 Read in x, y co-ordinates of points corresponding to sub-quad 603*a;*

Figure 7:
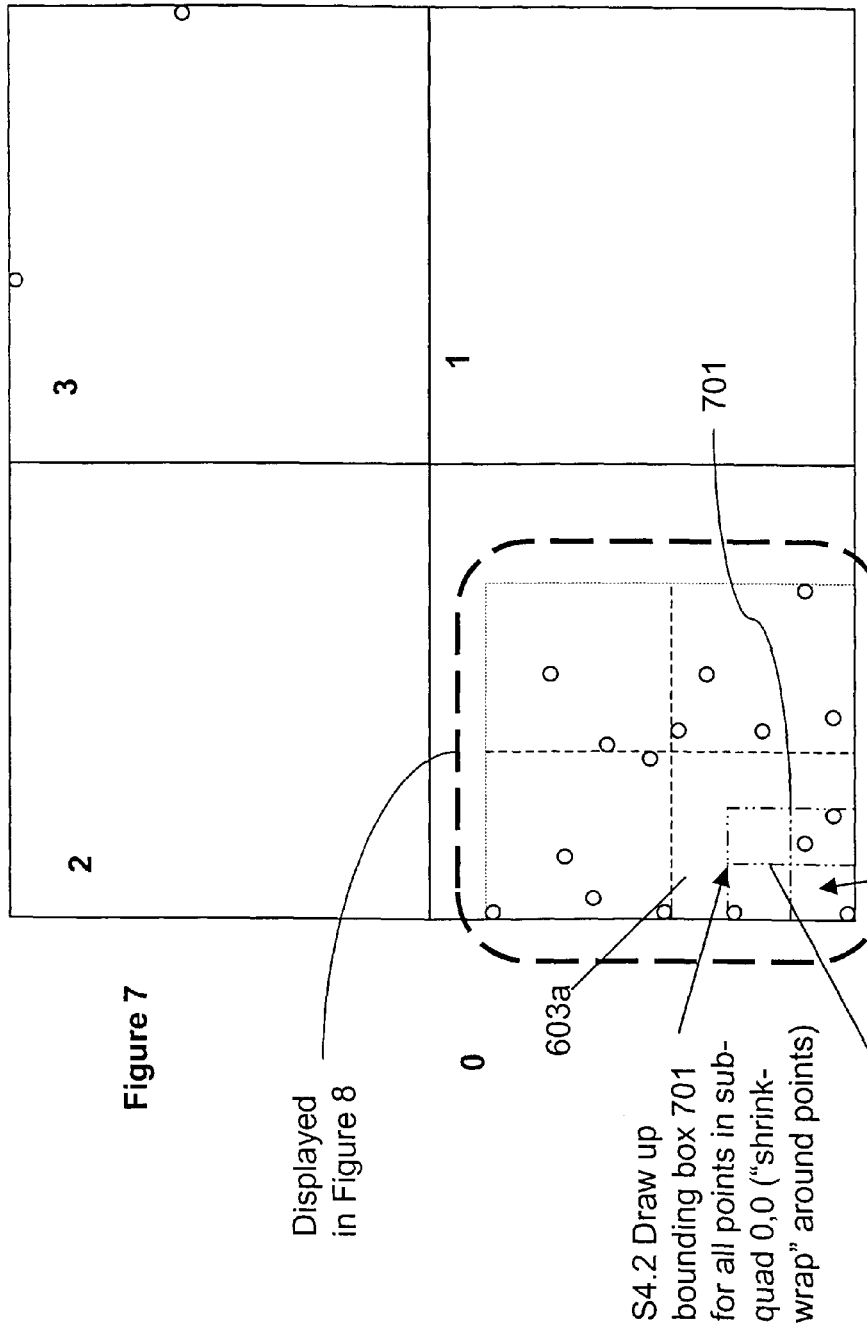
FIG. 7 is a schematic diagram showing application of the process of FIGS. 4a & 4b to create a sub-quad of one of the sub-quads of FIG. 6.

Step S4.2 Draw up bounding box for all points in sub-quad 0,0 (603*a*), creating "shrink-wrapped" sub-quad 0,0 701. As for sub-quad 0, the area without points within sub-quad 603*a* is ignored;

Step S4.3 & Step S4.4 Save extents of sub-quad 0, 0 (701)—i.e. dx, dy—and the co-ordinates of points in it;

Step S4.5 Check whether sub-quad 701 has positive size? (i.e. are dx, dy of quad 701 equal to zero?) As can be seen in FIG. 7, quad 701 has multiple points in it, dx, dy for quad 701 are non-zero, and this sub-quad 701 has positive size;

Step S4.6 Split sub-quad 0,0 701 into 4 sub-quads: 0,0,0 (703*a*), 0,0,1 (703*b*), 0,0,2 (703*c*), 0,0,3 (703*d*)

Step S4.6.1 Tag each point with its relevant sub-quad and record the number of points in each sub-quad;

Step S4.7 Starting with sub-quad 0,0,0 (703*a*) check whether there are any points in the sub-quad 0,0,0 (703*a*): there is one point in sub-quad 0,0,0 (703*a*) so input the points within this sub-quad 0,0,0 to Step S4.1 and run through steps Step S4.1 onwards for sub-quad 0,0,0 (703*a*), as described below with further reference to FIG. 7.

Also FIG. 7

Step S4.1 Read in x, y co-ordinates of points corresponding to sub-quad 703*a;*

Figure 8:
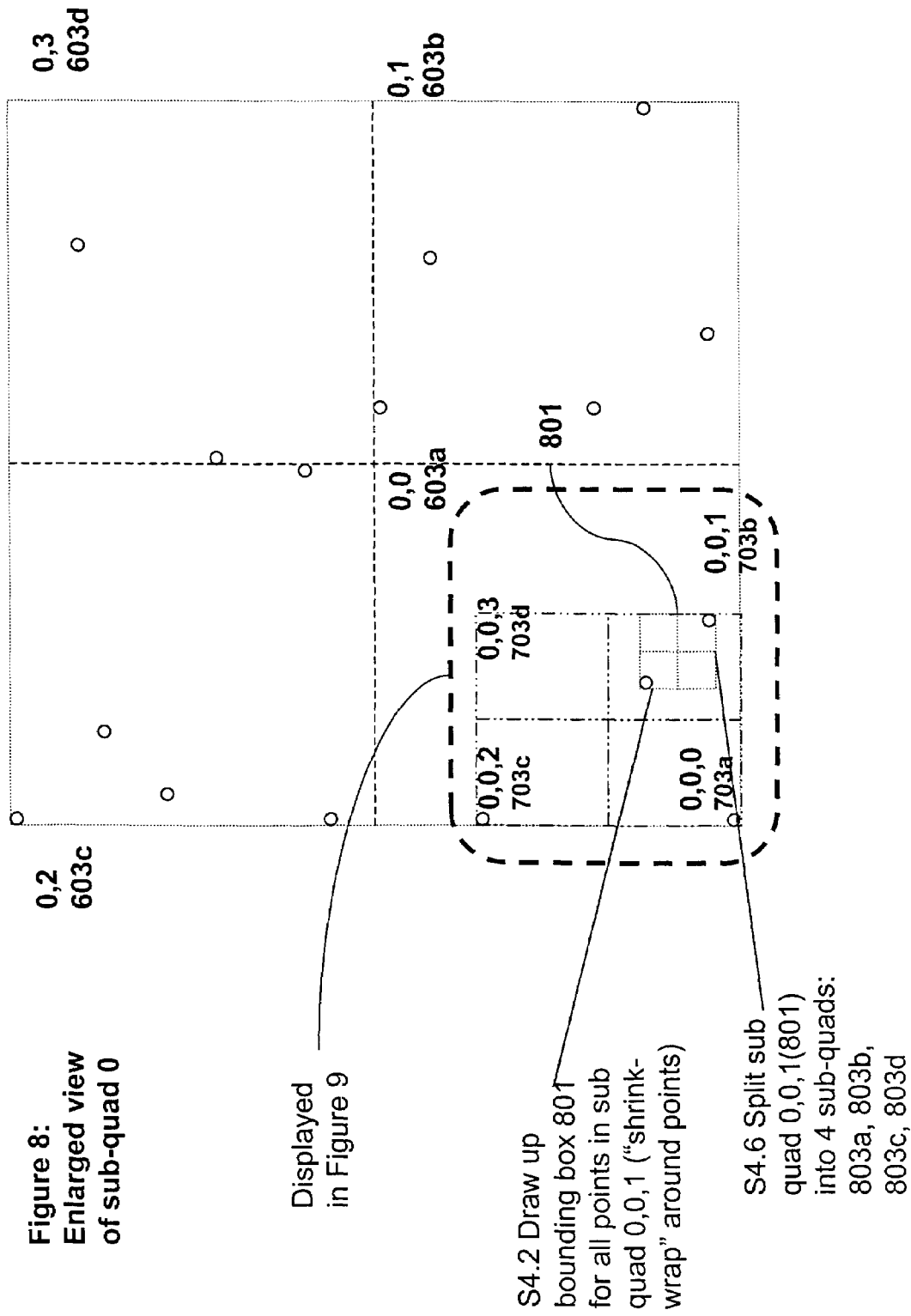
FIG. 8 is an expanded view of FIG. 7.

Step S4.2 Draw up bounding box for all points in sub-quad 0,0,0 (703*a*), creating "shrink-wrapped" sub-quad 0,0,0: here around a single point;

Step S4.3 & Step S4.4 Save the extents of the "shrink-wrapped" sub-quad 0,0,0, which is now down to a single point such that dx, dy=0, and save the co-ordinates of the point;

Step S4.5 Check whether sub-quad the point has positive size? (i.e. are dx, dy of the point equal to zero?) In fact dx and dy are both zero because the sub-quad 703*a* collapsed into a single point. So onto Step S4.8;

Step S4.8 Increment the sub-quad counter i at this level (0,0,i), input the points (Step S4.7) within sub-quad 0,0,1 (703*b*) to Step S4.1 and run through steps Step S4.1 onwards for sub-quad 0,0,1 (703*b*), as described below with reference to FIG. 8.

FIG. 8

Step S4.1 Read in x, y co-ordinates of points corresponding to sub-quad 703*b;*

Step S4.2 Draw up bounding box for all points in sub-quad 0,0,1 (703*b*) creating "shrink-wrapped" sub-quad 0,0,1 801. As for sub-quad 0, the area without points within sub-quad 703*b* is ignored;

Step S4.3 & Step S4.4 Save extents of sub-quad 801—i.e. dx, dy—and the co-ordinates of points in it;

Step S4.5 Check whether sub-quad 801 has positive size? (i.e. are dx, dy of quad 703*a* equal to zero?). Sub-quad 801 has multiple points in it, dx, dy for quad 801 are non-zero, and thus sub-quad 801 does have positive size;

Step S4.6 Split sub-quad 0,0,1 801 into 4 sub-quads: 0,0,1,0 (803*a*), 0,0,1,1 (803*b*), 0,0,1,2 (803*c*), 0,0,1,3 (803*d*)

Step S4.6.1 Tag each point with its relevant sub-quad and record the number of points in each sub-quad;

Step S4.7 Starting with sub-quad 0,0,1,0 (803*a*) Check whether there are any points in the sub-quad 0,0,1,0 (803*a*): There are no points in sub-quad 0,0,1,0 (803*a*);

Step S4.8 Increment the sub-quad counter i at this level (0,0,1,i) and input the points (Step S4.7) within sub-quad 0,0,1,1 (803*b*) to Step S4.1 and run through steps Step S4.1 onwards for sub-quad 0,0,1,1 (803*b*), as described below with reference to FIG. 9.

FIG. 9

Step S4.1 Read in x, y co-ordinates of points corresponding to sub-quad 803*b;*

Figure 9:
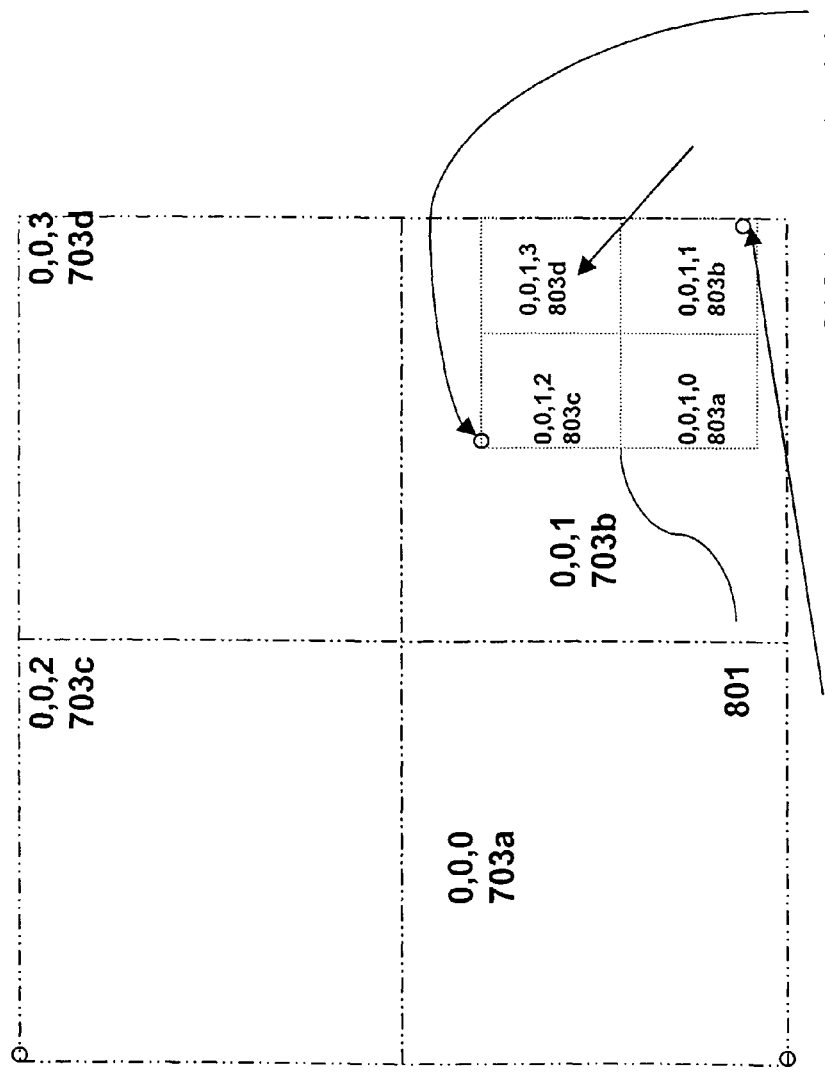
FIG. 9 is an expanded view of FIG. 8 showing application of the process of FIGS. 4a & 4b to create another of the sub-quads shown in FIG. 7.
Figure 10:
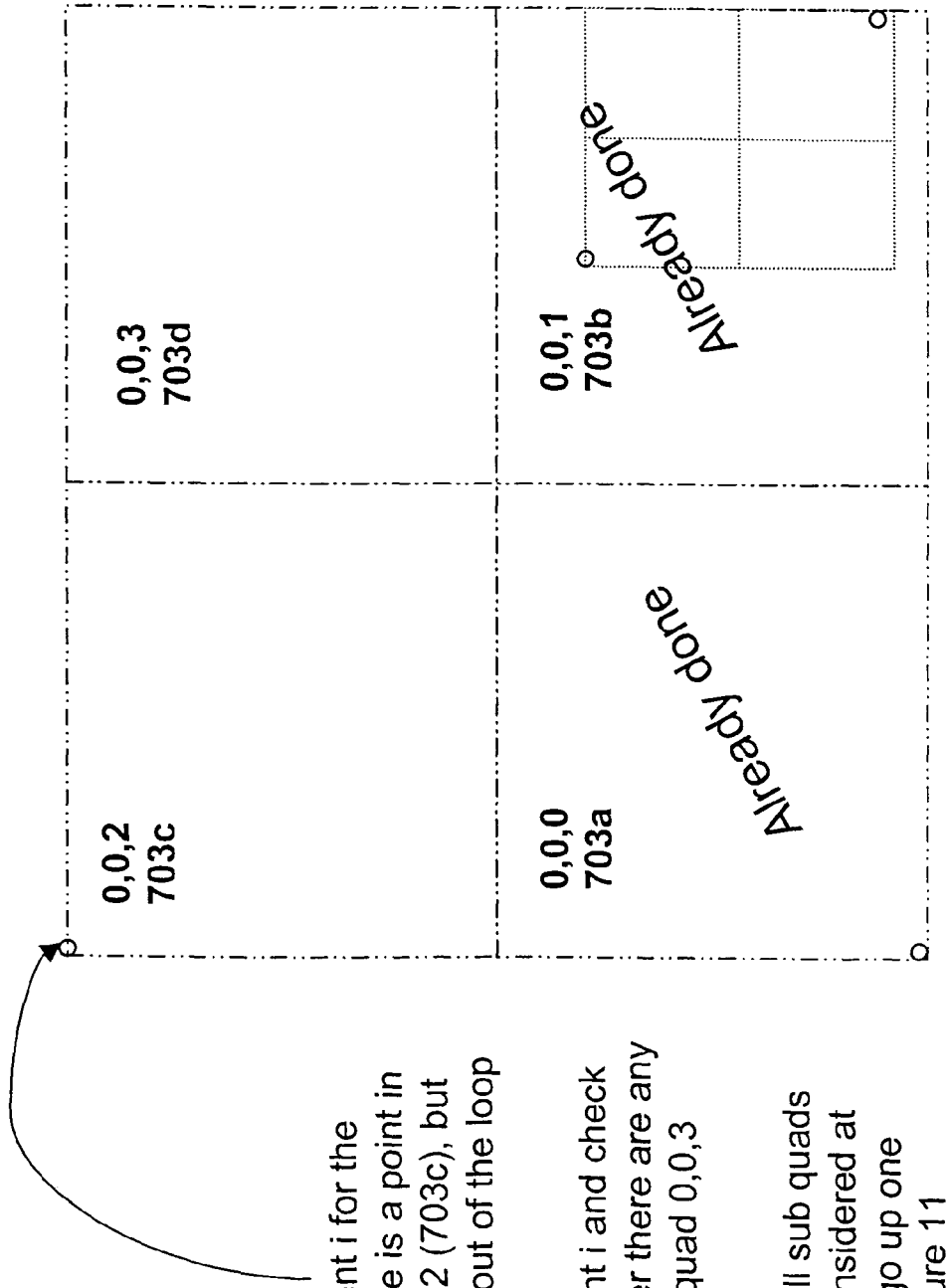
FIG. 10 is an expanded view of FIG. 8 showing application of the process of FIGS. 4a & 4b to create another of the sub-quads shown in FIG. 7.
Figure 11:
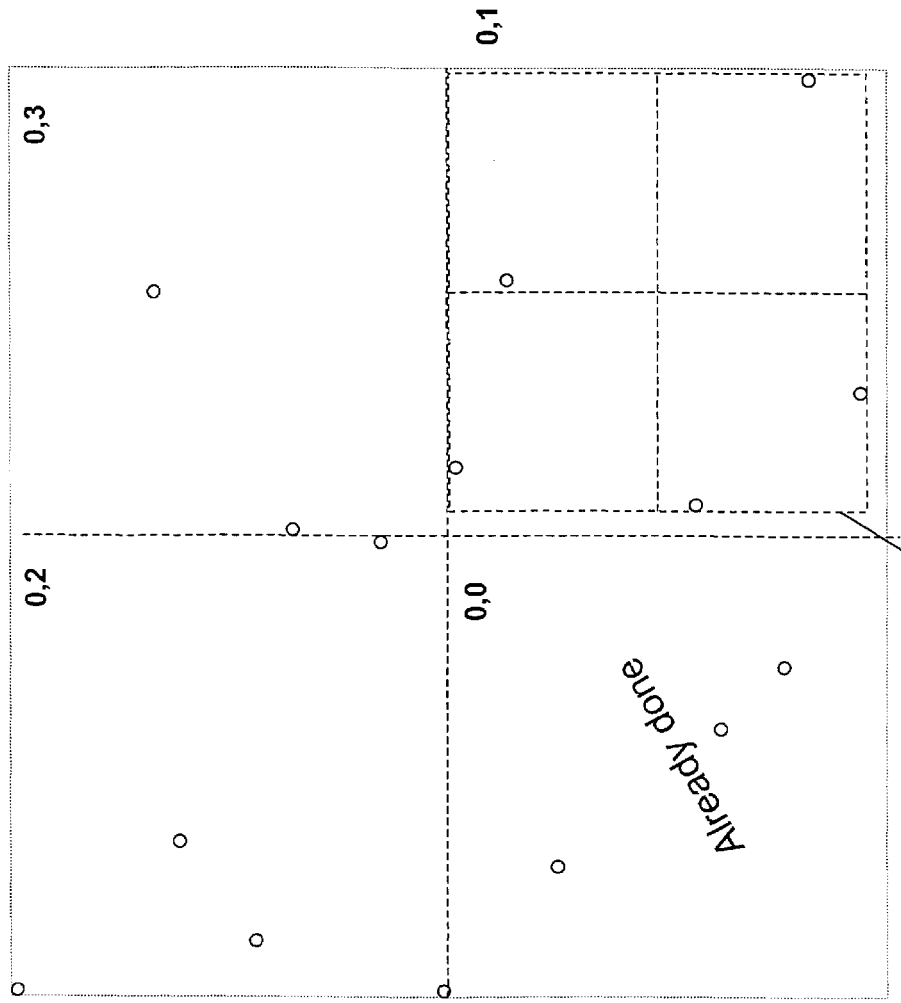
FIG. 11 is a schematic diagram showing application of the process of FIGS. 4a & 4b to create another sub-quad of one of the sub-quads of FIG. 6.

Step S4.2 Draw up bounding box for all points in sub-quad 0,0,1,1 (803*b*), creating "shrink-wrapped" sub-quad 0,0,1,1, which is a single point;

Step S4.3 & Step S4.4 Save extents of the single point—i.e. dx, dy—and the co-ordinates of the point;

Step S4.5 Check whether the point has positive size? (i.e. are dx, dy of the point equal to zero?) In fact dx and dy are both zero because the sub-quad 803*b* collapsed into a single point. So onto Step S4.8;

Step S4.8 Increment the sub-quad counter i at this level (0,0,1,i) and input the points within sub-quad 0,0,1,2 (803*b*) to Step S4.1 and run through steps Step S4.1 onwards for sub-quad 0,0,1,2 (803*b*), as described with further reference to FIG. 9

Also FIG. 9

Step S4.1 Read in x, y co-ordinates of points corresponding to sub-quad 803*c;*

Step S4.2 Draw up bounding box for all points in sub-quad 0,0,1,2 (803*c*), creating "shrink-wrapped" sub-quad 0,0,1,2, which is a single point;

Step S4.3 & Step S4.4 Save extents of the single point—i.e. dx, dy—and the co-ordinates of the point;

Step S4.5 Check whether the point has positive size? (i.e. are dx, dy of the point equal to zero?) In fact dx and dy are both zero because the sub-quad 803*c* collapsed into a single point. So onto Step S4.8;

Step S4.8 Increment the sub-quad counter i at this level (0,0,1,i). There are no points (Step S4.7) within sub-quad 0,0,1,3 (803*d*), so back to Step S4.8: increment the sub-quad counter i at this level (0,0,1,i): but i>3 so Step S4.9 Return to sub-quad level 0,0,i and increment the sub-quad counter from 1 to 2, and thus consider sub-quad 0,0,2 (703*c*): There is a point in sub-quad 0,0,2 (703*c*) so input the points (Step S4.7) within sub-quad 0,0,2 (703*c*) to Step S4.1 and run through steps Step S4.1 onwards for sub-quad 0,0,2 (703*c*), as described with reference to FIG. 10.

FIG. 10

Step S4.1 Read in x, y co-ordinates of points corresponding to sub-quad 703*c;*

Step S4.2 Draw up bounding box for all points in sub-quad 0,0,2 (703*c*), creating "shrink-wrapped" sub-quad 0,0,2, which is a single point;

Step S4.3 & Step S4.4 Save extents of the single point—i.e. dx, dy—and the co-ordinates of the point;

Step S4.5 Check whether the point has positive size? (i.e. are dx, dy of the point equal to zero?) In fact dx and dy are both zero because the sub-quad 703c collapsed into a single point. So onto Step S4.8;

Step S4.8 Increment the sub-quad counter i at this level (0,0,i). There are no points (Step S4.7) within sub-quad 0,0,3 (703d), so back to Step S4.8: increment the sub-quad counter i at this level (0,0,i): but i>3 so Step S4.9 Return to sub-quad level 0,i and increment the sub-quad counter i from 0 to 1, and thus consider sub-quad 0,1 (603b), as described with reference to FIG. 11.

FIG. 11

The process described in FIGS. 6-10 is repeated, but for sub-quad 0,1, and once all of the points within sub-quad 0,n have been assigned to sub-quads, the process moves onto sub-quad 1.

As described earlier, building an index to these points is then a matter of saving the sub-quad information. This can be engineered in many ways, but preferably the index comprises sub-quad information saved at steps S 4.3 and S 4.4, namely the extents of sub-quad (in x, y co-ordinates) and co-ordinates of points falling therein, and a link to the 4 sub-quadrants within the sub-quad. Thus the index essentially comprises a hierarchy of sub-quad structures where the hierarchy is given by the relationship between each successive sub-quad and its 4 sub-quads. The sub-quads are written to the index in accordance with the sub-quad hierarchy, from the largest sub-quad (here 501 on FIG. 5), down to the smallest sub-quad.

In addition to saving the sub-quad structures in the database DB1, the points are written to the database (either the same database or a different database), e.g. in a file, in an order given by the inverse of the sub-quad hierarchy. Thus in this case, points in the sub-quads at the bottom of the hierarchy are written to the file first. As the points are written to a file, a running tally of the total number of points is maintained, such that as each point is written to the file, a counter representing: current number of points encountered so far+1 is written to the respective sub-quad structure. The tally works from the smallest sub-quad up, and, for each sub-quad, essentially indicates the position of the first of all points in that sub-quad in terms of all of the points being indexed (Pos $_{sub\_quad}$) e.g. Referring to FIG. 12,

| Sub-quad | Points in sub-quad (N) | Number of first point written to sub-quad (Pos $_{sub\_quad}$) | Highlighted point in points file |
|---|---|---|---|
| 0, 0, 1, 1 | n (N = 1) | 1 | n, m, p, o . . . |
| 0, 0, 1, 2 | m (N = 1) | 2 | n, m, p, o . . . |
| 0, 0, 0 | p (N = 1) | 3 | n, m, p, o . . . |
| 0, 0, 1 | n, m (N = 2) | 1 | n, m, p, o . . . |
| 0, 0, 2 | o (N = 1) | 4 | n, m, p, o . . . |
| 0, 0 | n, m, p, o (N = 4) | 1 | n, m, p, o . . . |
| 0, 1, c, d | some points | 5 | n, m, p, o, Next . . . |

Thus points file for sub-quad 501 (the outermost quad, see FIG. 5) reads n,m,p,o . . . (starting from the smallest sub-quad 0,0,1,1). As both the number of points, (N) and the number in the running tally of points (Pos $_{sub\_quad}$) corresponding to the first point in a sub-quad, are written to the sub-quad, then once a sub-quad of interest has been identified, the points that lie within the identified sub-quad can be extracted by moving to Pos $_{sub\_quad}$ in the points file and extracting N points from that position. This is demonstrated in an embodiment demonstrating retrieval of points.

Retrieval of Information

The second invention relates to a method of retrieving entities by means of an index of elements related to the entities, when the relationship between each element and other elements in the index, and the relationship between elements in the index and the entities being indexed, is known. The method is readily applicable to an index created in accordance with the method of indexing presented above, because the index comprises a hierarchy of sub-quad structures, and the hierarchy is well defined (by quad->sub-quad relationships). However, it should be borne in mind that the method is equally applicable to any type of index that satisfies these conditions.

In the following description, an embodiment of the retrieval process is described, where an index to points is queried with a query specifying a "region of interest". It is assumed that:

the elements in the index are a plurality of areas within a predetermined area, the entities being indexed are points defined by two dimensions;

there is a predetermined relationship between the areas; and there is a predetermined relationship between the areas and the points.

Essentially the embodiment identifies which of the areas a) overlaps with the region of interest, and b) contains points within those areas that overlap with the region of interest.

The predetermined relationship between areas and the points is then used to extract points falling within the identified areas.

Figure 33C:
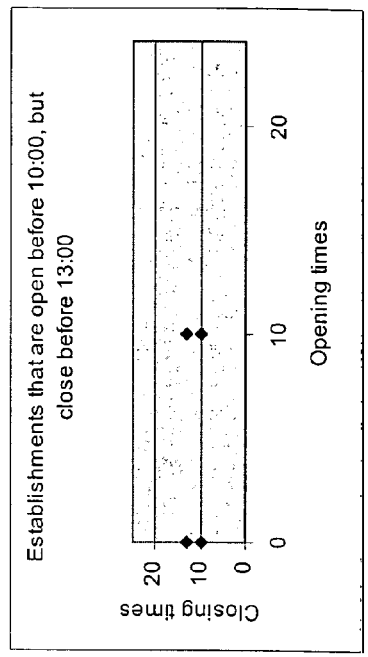
Figure 33D:
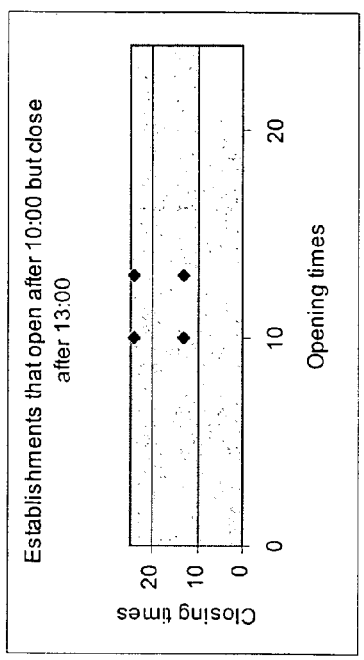
Figure 33E:
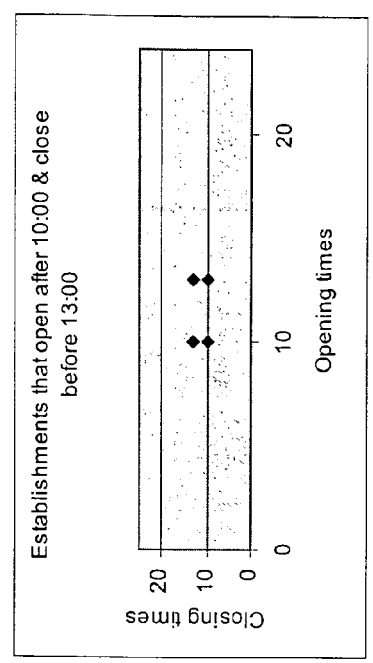
Figure 33A:
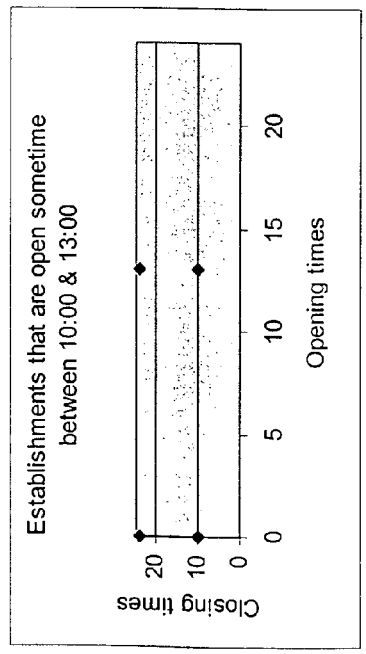

A region of interest refers to a region within the two dimensional representation of the entity. Thus for the temporal range described above (closing and opening times of business and leisure establishments), a region of interest would be a time period of interest—such as "shops open between 10:00 and 13:00 hours". The region of interest would then be defined by a region (preferably a square) bounded within prespecified points. Referring to FIG. 33a-e, the region of interest could be any one of:

(0,10), (13,24)≡establishments that are open sometime between 10:00 & 13:00 (FIG. 33a)

Figure 33B:
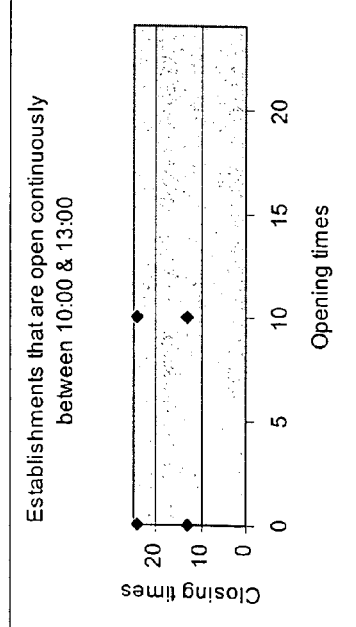

(0,13), (10,24)≡establishments that are open continuously between 10:00 & 13:00 (FIG. 33b)

(0,10), (10,13)≡establishments that are open before 10:00, but close before 13:00 (FIG. 33c)

(10,13), (13,24) establishments that open after 10:00 but close after 13:00 (FIG. 33d)

(10,10), (13,13) establishments that open after 10:00 & close before 13:00 (FIG. 33e)

Similarly, for the pricing range described above, a region of interest would be range of prices, so that, for a retrieval requirement of "all items that fall somewhere in the range of £50.00 and £80.00", the region of interest could be defined by a region bounded within the points (0,50) and (80,80).

For the location information described above, a region of interest would be a range of positions, such as "all items located between a first position ((lat, long)1) and a second position ((lat, long)$_2$)".

A flow diagram showing steps of a method of identifying areas that overlap with the region of interest, when the region of interest relates to location information, is shown in FIGS. 13a and 13b. The steps are then illustrated, for the region of interest shown in FIG. 14, in FIGS. 14-31. In this embodiment, specific examples of areas within a predetermined region are referred to as quads and sub-quads. The method steps shown in FIG. 13 are described below with reference to each of FIGS. 14-31.

FIG. 14

S13.1.1 Read in x, y co-ordinates of a region of interest (x1,y1) (x2,y2). As an example, if a user wants to locate garages in a certain area, these might be indexed as latitude/longitude pairs defining points in a two-dimensional space and the geographical area that the user is interested in can be expressed as a "region of interest" in the two-dimensional space;

S13.1.2 Retrieve co-ordinates of points and size of quad for the outermost quad and set (X1_Q, Y1_Q) (X2_Q, Y2_Q) to size of outermost quad;

S13.2 Assess whether the region of interest requires cropping: if x1<X1_Q set x1=X1_Q; if y1<Y1_Q set y1=Y1_Q; if x2>X2_Q set x2=X2_Q; if y2>Y2_Q set y2=Y2_Q. For the example region of interest shown in FIG. 14, none of these conditions are satisfied;

S13.3 Assess whether x1>x2 or y1>y2. In this case neither conditions are satisfied;

Steps S13.2 and S13.3 are only one example of conditions that can be applied to establish whether the sub quad retrieved at S13.1.2 overlaps with the region of interest, and whether, if there is overlap, there are any points within the overlapping region; it is envisaged that alternative methods could be applied to establish this.

Figure 15:
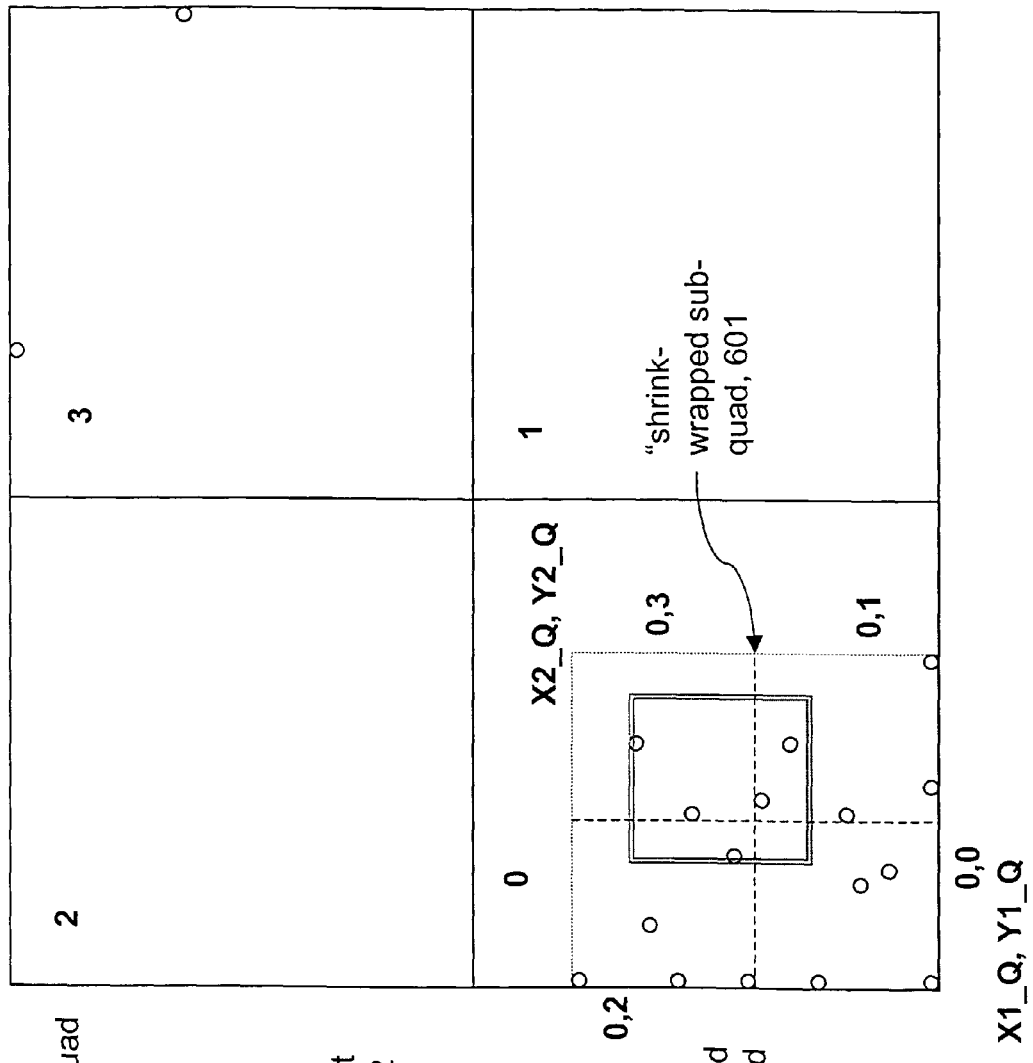
FIG. 15 is a schematic diagram showing application of the process of FIGS. 13a & 13b to one of the sub-quads of FIG. 6.

S13.4 Assess whether the region of interest overlaps exactly with the quad. No:

S13.5 Retrieve a sub-quad (503*a*) of the present quad (501) in accordance with S13.1.2, as is described with reference to FIG. 15

FIG. 15

Figure 17:
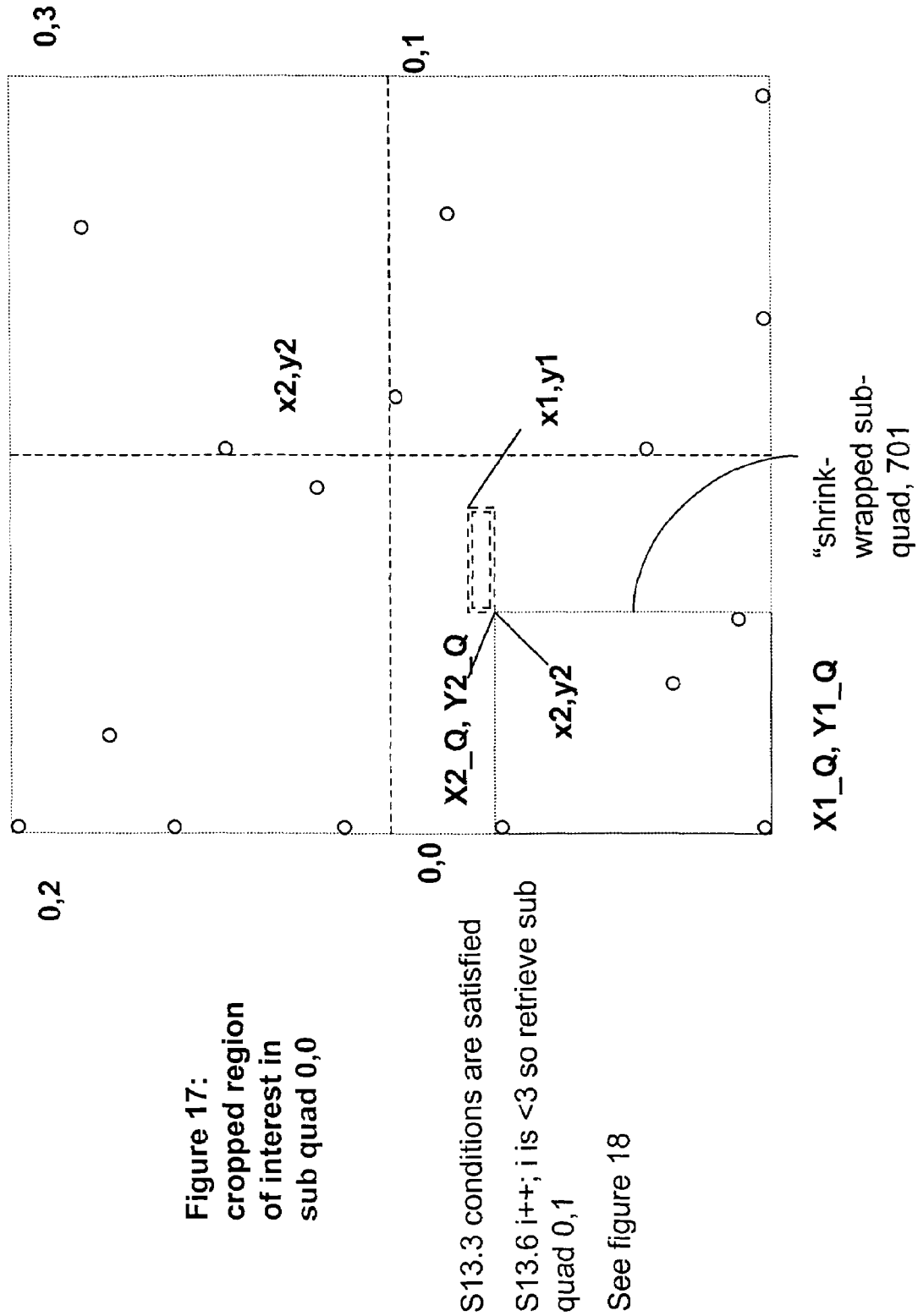

S13.1.2 Retrieve co-ordinates of points and size of sub-quad from "shrink-wrapped" sub-quad 0 601: set (X1_Q, Y1_Q) (X2_Q, Y2_Q) to size of "shrink-wrapped" sub-quad 601;

S13.2 Assess whether the region of interest requires cropping: if x1<X1_Q set x1=X1_Q; if y1<Y1_Q set y1=Y1_Q; if x2>X2_Q set x2=X2_Q; if y2>Y2_Q set y2=Y2_Q. In this case none of these conditions are satisfied;

S13.3 Assess whether x1>x2 or y1>y2. In this case neither conditions are satisfied;

S13.4 Assess whether the region of interest overlaps exactly with the sub-quad. No:

S13.5 Retrieve a sub-quad of the present sub-quad in accordance with S13.1.2, as is described with reference to FIGS. 16 and 17

FIGS. 16 & 17

Figure 18:
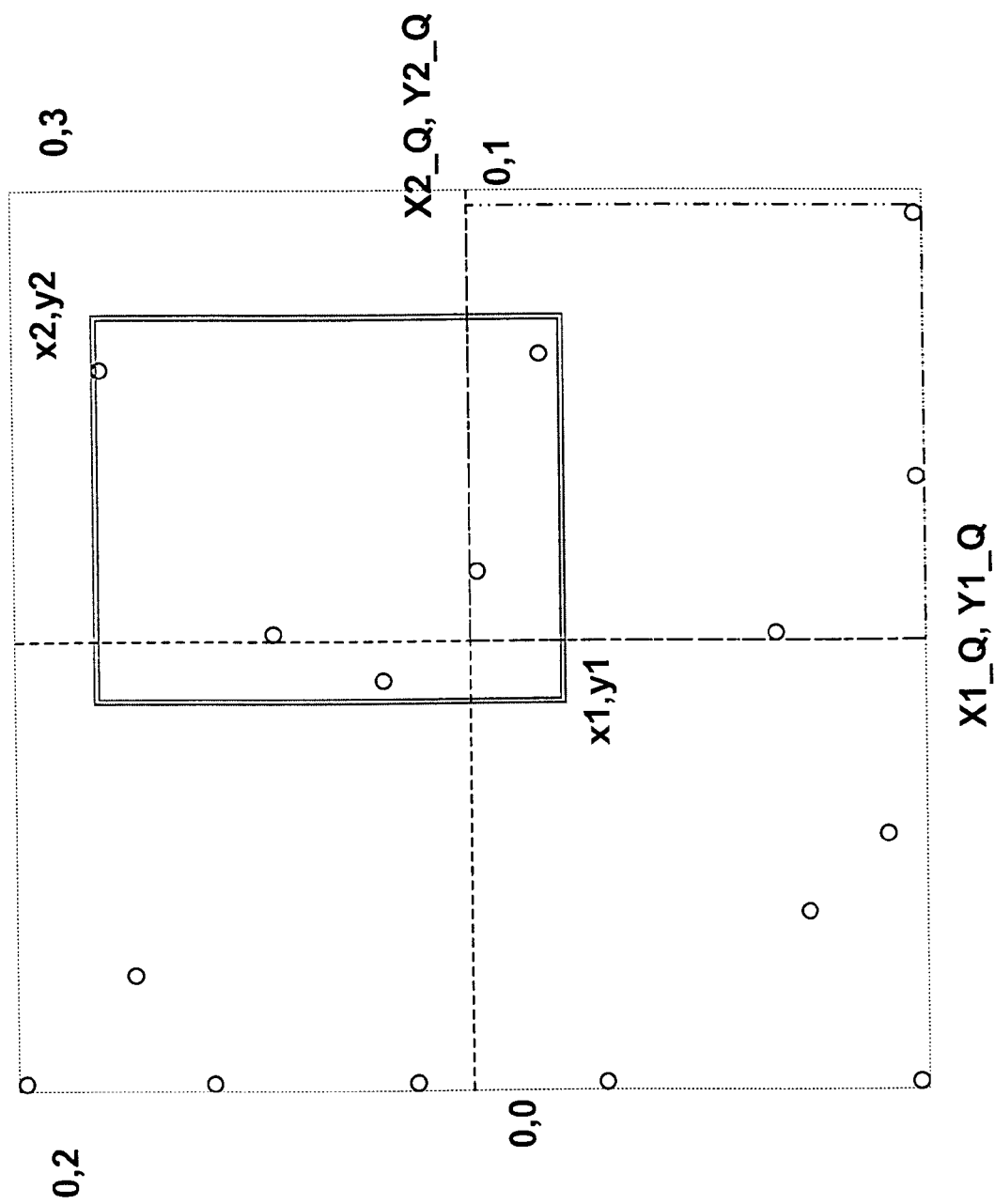
FIG. 18 is an enlarged view of FIG. 15 and shows the area of interest and a second of the sub-quads of FIG. 7.
Figure 19:
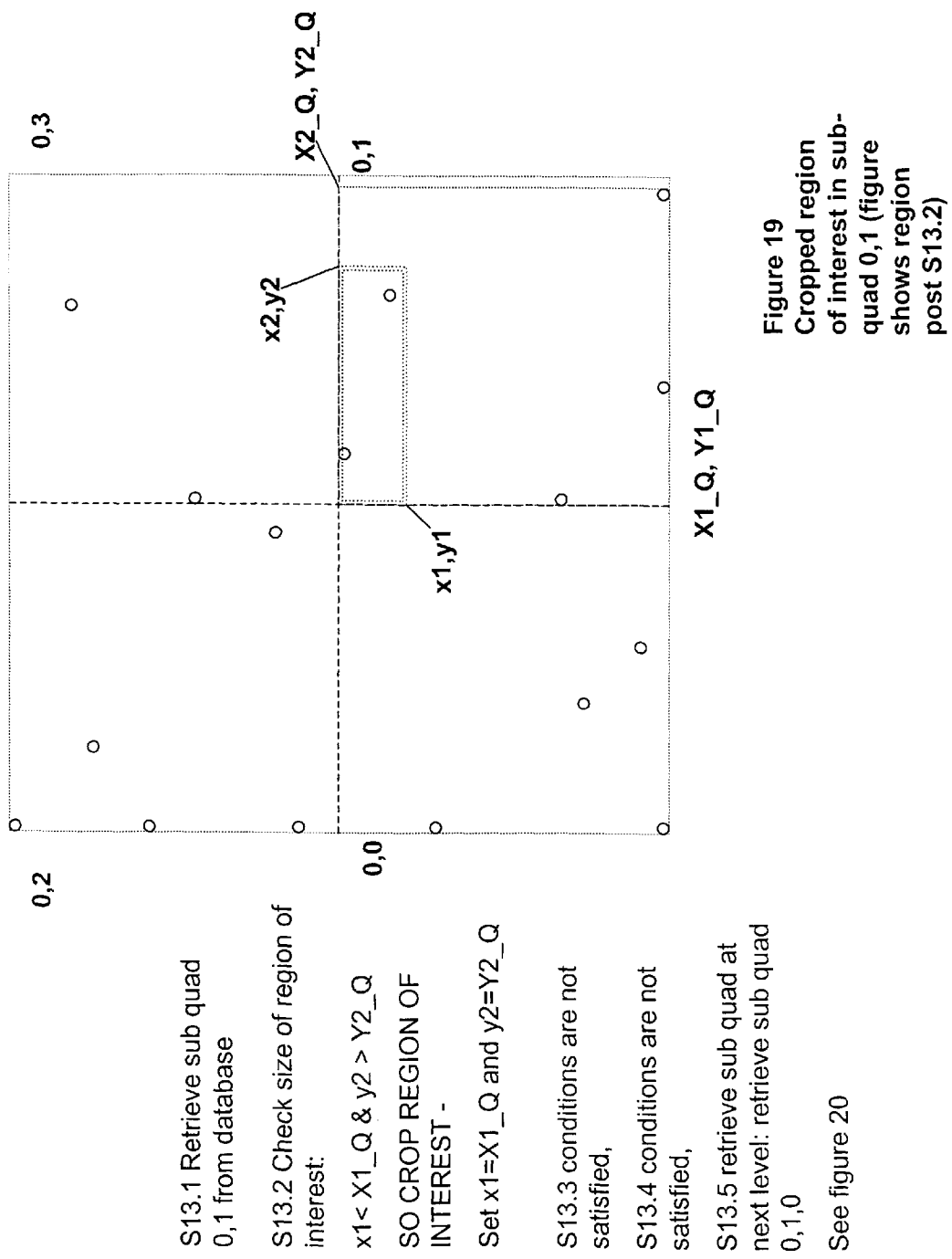
FIG. 19 is a schematic diagram corresponding to FIG. 18 showing application of the process of FIGS. 13a & 13b to the second of the sub-quads of FIG. 7.

S13.1.2 Retrieve co-ordinates of points and size of sub-quad from "shrink-wrapped" sub-quad 0,0 701: set (X1_Q, Y1_Q) (X2_Q, Y2_Q) to size of "shrink-wrapped" sub-quad 701;

S13.2 Assess whether the region of interest requires cropping: x2>X2_Q so set x2=X2_Q and y2>Y2_Q so set y2=Y2_Q;

S13.3 Assess whether x1>x2 or y1>y2. In this case (FIG. 17) both conditions are satisfied, which means that there are no points in sub-quad 0,0 (701) that fall within the region of interest;

S13.6 Increment sub-quad counter i at this level (0,i), and retrieve sub-quad (0,1) in accordance with S13.1.2, as described with reference to FIGS. 18 and 19.

FIGS. 18 & 19

S13.1.2 Retrieve co-ordinates of points and size of sub-quad from "shrink-wrapped" sub-quad 0,1: set (X1_Q, Y1_Q) (X2_Q, Y2_Q) to size of "shrink-wrapped" sub-quad 0,1;

S13.2 Assess whether the region of interest requires cropping: x1<X1_Q so set x1=X1_Q and y2>Y2_Q so set y2=Y2_Q;

S13.3 Assess whether x1>x2 or y1>y2. In this case neither conditions are satisfied;

S13.4 Assess whether the region of interest (now cropped) overlaps exactly with the sub-quad. No:

S13.5 Retrieve a sub-quad 0,1,0 of the present sub-quad 0,1 in accordance with S13.1.2, as is described with reference to FIGS. 20*a* and 20*b*.

FIGS. 20*a* & 20*b*

S13.1.2 Retrieve co-ordinates of points and size of sub-quad from "shrink-wrapped" sub-quad 0,1,0: set (X1_Q, Y1_Q) (X2_Q, Y2_Q) to size of "shrink-wrapped" sub-quad 0,1,0;

S13.2 Assess whether the region of interest requires cropping: x2>X2_Q so set x2=X2_Q and y2>Y2_Q so set y2=Y2_Q;

S13.3 Assess whether x1>x2 or y1>y2. In this case (FIG. 20*b*) both conditions are satisfied, which means that there are no points in sub-quad 0,1,0 that fall within the region of interest;

S13.6 Increment sub-quad counter i at this level (0,1,i), and (S13.6.1) retrieve sub-quad (0,1,1) in accordance with S13.1.2, as is described with reference to FIGS. 21*a* and 21*b*.

FIGS. 21*a* & 21*b*

S13.1.2 Retrieve co-ordinates of points and size of sub-quad from "shrink-wrapped" sub-quad 0,1,1: set (X1_Q, Y1_Q) (X2_Q, Y2_Q) to size of "shrink-wrapped" sub-quad 0,1,1—i.e. a single point;

S13.2 Assess whether the region of interest requires cropping: x1<X1_Q so set x1=X1_Q and y2>Y2_Q so set y2=Y2_Q;

S13.3 Assess whether x1>x2 or y1>y2. In this case (FIG. 21*b*) both conditions are satisfied, which means that there are no points in sub-quad 0,1,1 that fall within the region of interest;

S13.6 Increment sub-quad counter i at this level (0,1,i), and (S13.6.1) retrieve sub-quad (0,1,2) in accordance with S13.1.2, as is described with reference to FIGS. 22*a* and 22*b*.

FIGS. 22*a* & 22*b*

S13.1.2 Retrieve co-ordinates of points and size of sub-quad from "shrink-wrapped" sub-quad 0,1,2: set (X1_Q, Y1_Q) (X2_Q, Y2_Q) to size of "shrink-wrapped" sub-quad 0,1,2—i.e. a single point;

S13.2 Assess whether the region of interest requires cropping: x1<X1_Q so set x1=X1_Q, y1<Y1_Q, x2>X2_Q and y2>Y2_Q so set x1=X1_Q, y1=Y1_Q, x2=X2_Q, y2=Y2_Q;

S13.3 Assess whether x1>x2 or y1>y2. No

S13.4 Assess whether the region of interest (now cropped) overlaps exactly with the sub-quad: YES S13.4.2 Record the sub-quad and number of points within the sub-quad (here 1);

S13.6 Increment sub-quad counter i at this level (0,1,i), and (S13.6.1) retrieve sub-quad (0,1,3) in accordance with S13.1.2, as is described with reference to FIGS. 23*a* and 23*b*.

FIGS. 23a & 23b

S13.1.2 Retrieve co-ordinates of points and size of sub-quad from "shrink-wrapped" sub-quad 0,1,3: set (X1_Q, Y1_Q) (X2_Q, Y2_Q) to size of "shrink-wrapped" sub-quad 0,1,3—i.e. a single point;

S13.2 Assess whether the region of interest requires cropping: x1<X1_Q so set x1=X1_Q, y1<Y1_Q, x2>X2_Q and y2>Y2_Q so set x1=X1_Q, y1=Y1_Q, x2=X2_Q, y2=Y2_Q;

S13.3 Assess whether x1>x2 or y1>y2. No

S13.4 Assess whether the region of interest (now cropped) overlaps exactly with the sub-quad: YES S13.4.2 Record the sub-quad and number of points within the sub-quad (here 1);

S13.6 Increment sub-quad counter i at this level (0,1,i) . . . i>3 so (S13.6.2) retrieve sub-quad (0,2) in accordance with S13.1.2, as is described with reference to FIGS. 24 and 25.

FIGS. 24 & 25

S13.1.2 Retrieve co-ordinates of points and size of sub-quad from "shrink-wrapped" sub-quad 0,2: set (X1_Q, Y1_Q) (X2_Q, Y2_Q) to size of "shrink-wrapped" sub-quad 0,2;

S13.2 Assess whether the region of interest requires cropping: y1<Y1_Q so set y1=Y1_Q and x2>X2_Q so set x2=X2_Q;

S13.3 Assess whether x1>x2 or y1>y2. In this case neither conditions are satisfied;

S13.4 Assess whether the region of interest (now cropped) overlaps exactly with the sub-quad. No:

S13.5 Retrieve a sub-quad 0,2,0 of the present sub-quad 0,2 in accordance with S13.1.2, as is described with reference to FIGS. 26a and 26b.

FIGS. 26a & 26b

S13.1.2 Retrieve co-ordinates of points and size of sub-quad from "shrink-wrapped" sub-quad 0,2,0: set (X1_Q, Y1_Q) (X2_Q, Y2_Q) to size of "shrink-wrapped" sub-quad 0,2,0;

S13.2 Assess whether the region of interest requires cropping: x2>X2_Q so set x2=X2_Q and y2>Y2_Q so set y2=Y2_Q;

S13.3 Assess whether x1>x2 or y1>y2. In this case (FIG. 26b) both conditions are satisfied, which means that there are no points in sub-quad 0,2,0 that fall within the region of interest;

S13.6 Increment sub-quad counter i at this level (0,2,i), and (S13.6.1) retrieve sub-quad (0,2,1) in accordance with S13.1.2, as is described with reference to FIGS. 27a and 27b.

FIGS. 27a & 27b

S13.1.2 Retrieve co-ordinates of points and size of sub-quad from "shrink-wrapped" sub-quad 0,2,1: set (X1_Q, Y1_Q) (X2_Q, Y2_Q) to size of "shrink-wrapped" sub-quad 0,2,1—i.e. a single point;

S13.2 Assess whether the region of interest requires cropping: x1<X1_Q so set x1=X1_Q, y1<Y1_Q, x2>X2_Q and y2>Y2_Q so set x1=X1_Q, y1=Y1_Q, x2=X2_Q, y2=Y2_Q;

S13.3 Assess whether x1>x2 or y1>y2. No

S13.4 Assess whether the region of interest (now cropped) overlaps exactly with the sub-quad: YES S13.4.2 Record the sub-quad and number of points within the sub-quad (here 1);

S13.6 Increment sub-quad counter i at this level (0,1,i) . . . i<3 so (S13.6.1) retrieve sub-quad (0,2,2) in accordance with S13.1.2, as is described with reference to FIGS. 28a and 28b.

FIGS. 28a & 28b

Figure 29:
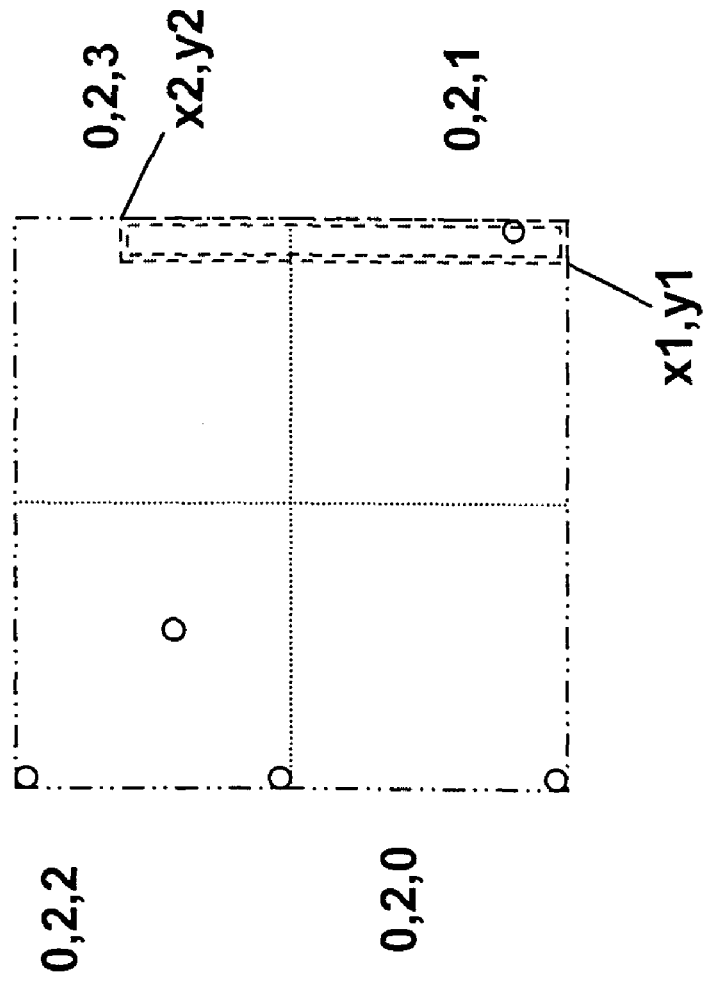
FIGS. 29a & 29b are schematic diagrams showing application of the process of FIGS. 13a & 13b to another sub-quad (a fourth) of the sub-quad shown in FIG. 24.

S13.1.2 Retrieve co-ordinates of points and size of sub-quad from "shrink-wrapped" sub-quad 0,2,2: set (X1_Q, Y1_Q) (X2_Q, Y2_Q) to size of "shrink-wrapped" sub-quad 0,2,2;

S13.2 Assess whether the region of interest requires cropping: x2>X2_Q so set x2=X2_Q and y1<Y1_Q so set y1=Y1_Q;

S13.3 Assess whether x1>x2 or y1>y2. In this case (FIG. 28b) both conditions are satisfied, which means that there are no points in sub-quad 0,2,2 that fall within the region of interest;

S13.6 Increment sub-quad counter i at this level (0,2,i), and (S13.6.1) retrieve sub-quad (0,2,3) in accordance with S13.1.2, as is described with reference to FIG. 29.

FIG. 29

S13.1.2 Retrieve co-ordinates of points and size of sub-quad from "shrink-wrapped" sub-quad 0,2,3: there is no sub-quad corresponding to 0,2,3 because there are no points in the area corresponding to this sub-quad, so jump to S13.6

S13.6.2 Increment sub-quad counter i at this level (0,2,i): i>3, so (S13.6.2) retrieve sub-quad (0,3) in accordance with S13.1.2, as is described with reference to FIGS. 30 and 31.

FIGS. 30 & 31

S13.2 Assess whether the region of interest requires cropping: x1<X1_Q so set x1=X1_Q, y1<Y1_Q, x2>X2_Q and y2>Y2_Q so set x1=X1_Q, y1=Y1_Q x2=X2_Q, y2=Y2_Q;

S13.3 Assess whether x1>x2 or y1>y2. No

S13.4 Assess whether the region of interest (now cropped) overlaps exactly with the sub-quad: YES S13.4.2 Record the sub-quad and number of points within the sub-quad (here 2);

S13.6 Increment sub-quad counter i at this level (0,i) . . . i>3 so (S13.6.2) retrieve sub-quad 1 in accordance with S13.1.2.

Figure 14:
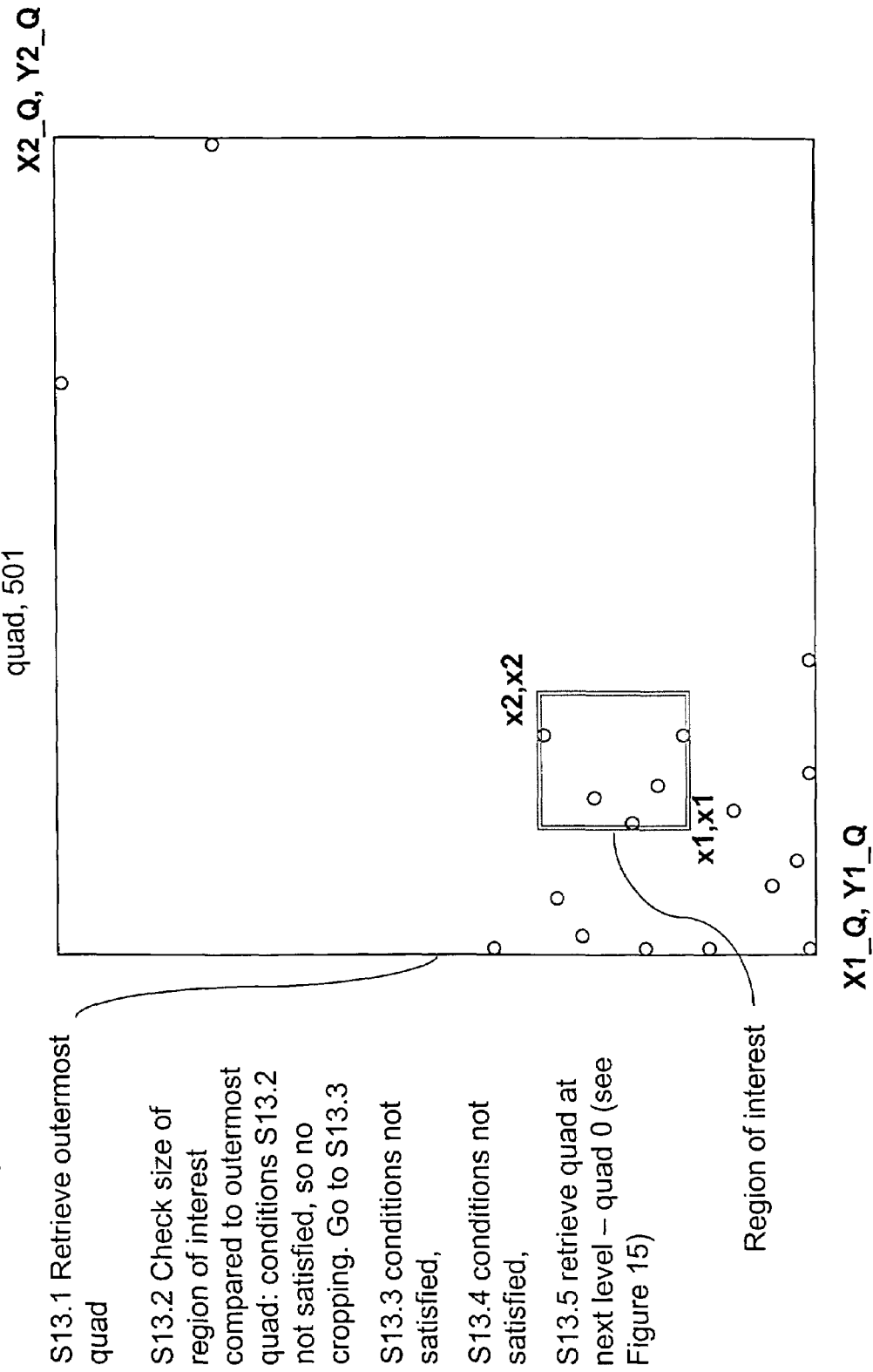
FIG. 14 is a schematic diagram showing an example of an area of interest for which points are to be retrieved.

As can be seen from FIG. 14, the region of interest falls solely within sub-quad 0 and the sub-quads therein, such that when process described in FIGS. 13a and 13b is applied to sub-quads 1, 2 and 3, the conditions applied at steps S13.2 and S13.3 will cause the process to terminate within a few steps.

At the end of the process of identifying sub-quads overlapping with the region of interest, the sub-quads, and the number of points within those sub-quads, that were recorded at steps S13.4.2 are returned—for this example:

sub-quad 0,1,2 number of points: 1 point;
sub-quad 0,1,3 number of points: 1 point;
sub-quad 0,2,1 number of points: 1 point;
sub-quad 0,3 number of points: 2 points.

Figure 32:
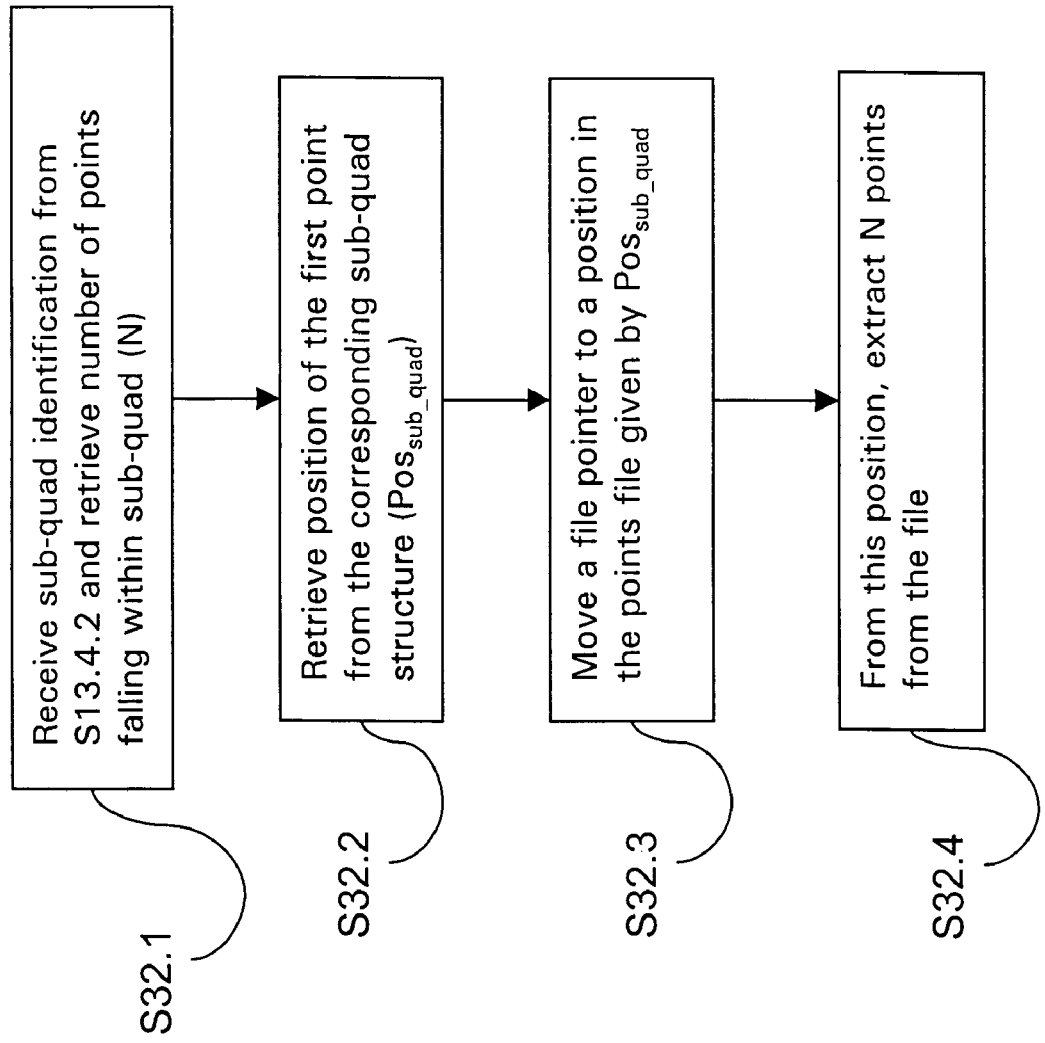
FIG. 32 is a flow diagram showing further steps involved in the retrieving process of FIGS. 13a & 13b; and Each of FIGS. 33a-33e is a schematic illustration of a region of interest for which points are to be retrieved according to the invention.

Once the sub-quads have been identified, the actual points are retrieved. In this embodiment, and as described above, the points are stored in a flat file. Furthermore each sub-quad structure stores a number indicating the position, relative to the total number of points being indexed (Referring for example to FIG. 4, all of the points within quad 501), of the first point within a respective sub-quad. The process for actual retrieval of points is shown in FIG. 32: For each quad that was recorded at step S13.4.2:

S32.1 For that sub-quad retrieve number of points falling within sub-quad (N);
S32.2 Retrieve position of the first point from the corresponding sub-quad structure (Pos $_{sub\_quad}$);
S32.3 Move a file pointer to a position in the points file given by Pos $_{sub\_quad}$;
S32.4 From this position, extract N points from the file.

Implementation

The processes described in FIGS. 4a and 4b, FIGS. 13a and 13b and FIG. 32 are implemented in software, and run on one of, or distributed between, the terminals T3, T4. Terminals T3, T4 are thus representative of one or a plurality of computers, and are preferably server computers.

Points to be indexed can be input to terminals T3, T4 via a file or similar, the index created as described above can be stored in the database DB1, and the points file can also be stored in the database DB1. An area of interest can be input in the form of a database query, entered via a client terminal (not shown) and communicated over the network N1 in a known manner.

Preferably the processes described above are implemented in the C programming language, and use recursive programming methods to "burrow down" to sub-quads within sub-quads. It is understood that such a method is inessential to the invention.

Additional Details and Modifications

As stated above, the invention can be used to index and retrieve data that is expressed in 2 dimensions. The invention can also be used to index and retrieve data of more than 2 dimensions, providing the data (n-dimensional data, where n>2) can be transformed into 2-dimensions. In such cases the transformed, 2-dimensional, data can be indexed and retrieved according to the invention. For example, objects defined in 3-dimensional space can be transformed into 2-dimensions using a package such as NCAR Graphics, which is a Unix based graphics package that offers a wide range of capabilities for the display and manipulation of numerical data, and has been developed by the University Corporation for Atmospheric Research. (See http://www.d-krz.de/ngdoc/ng4.0.1 for information relating to NCAR graphics and http://ngwww.ucar.edu/ngdoc/ng/fund/chp16-21/threed.html for information relating to the 3 to 2 dimensional transformation aspects).

Other variations could be made. For instance, a simple one would be to use division of quads and sub-quads into different numbers of areas in each iteration, such as eight or ten instead of four.

What is claimed is:

1. A method of retrieving one or more points that are contained within a predetermined area, said method comprising:
    (i) retrieving data identifying a region, the region encompassing one or more points and being associated with linking data which, for each region, identifies the point or points encompassed by that region;
    (ii) performing a process in respect of the region, the process comprising:
        comparing extents of the region with extents of the predetermined area in order to establish whether the region overlaps with the predetermined area;
        if there is overlap, retrieving data identifying sub-regions of the region and identifying any such sub-regions whose extents are wholly within the predetermined area;
    (iii) for each sub-region, repeating the process until all sub-regions thereof falling wholly within the predetermined area are identified, and
    (iv) accessing linking data corresponding to the identified sub-regions to retrieve points encompassed by the sub-regions wherein:
    the area represented by the total set of points is first divided into top level quads;
    each quad is examined for the presence of points;
    quads which do not contain points are not considered further;
    the boundaries of quads which do contain one or more points are shrunk wrapped around the set of contained points;
    if the quad only contains a single point, then the shrink wrapping reduces to zero, the point is associated with that quad and processing ends for that particular quad;
    where more than one point is present in a quad, the shrunk wrap area is divided into first level sub quads and the shrink wrap procedure is repeated on each of the first level sub-quads; and
    subsequent lower level sub-quads are produced until each point is associated with a single quad.

2. A method as in claim 1, wherein:
    the plurality of points is pre-stored as a list of points in accordance with relationships between sub-regions;
    the linking data includes a value indicating the position of a first of the corresponding encompassed points in the list of points; and
    the accessing step (iv) comprises, for each of the identified sub-regions:
        retrieving an identifier representative of the number of encompassed points and retrieving a position value associated with the identified sub-region; and
        accessing the list of points and retrieving the number of encompassed points from a position in the list given by the position value.

3. A method as in claim 1, in which the data identifying the region and sub-regions and corresponding linking data are stored in an index.

4. A method as in claim 1, in which the predetermined area corresponds to range information comprising two data defining a range of values.

5. A method as in claim 4, in which the range information includes any one of geographical range information, operating hours information, delivery time information, and/or medical information.

6. A method as in claim 1 wherein, to perform a search, the user defines a search region and the search process determines which points fall within the search region,
    quads which overlap the search region are identified and then first level sub-quads of the overlapping quads are tested to determine whether they are wholly contained within the search region;
    if not so contained, the overlap and wholly contained tests are repeatedly carried out on lower level sub-quads until the quad/sub-quad falling within the search region have been identified, and
    the set of points associated with the sub-quads are identified as search results.

7. A method as in claim 1 wherein:
    multiple levels of sub-quads are generated, each lowest level sub-quad encompassing a single point;
    the points are stored in a points database in an order given by the inverse of the sub-quad hierarchy;

once a sub-quad of interest has been identified, the points that lie within the identified sub-quad are extracted by moving to a points file and N points are extracted from that position.

8. A method in claim 1 wherein:

the size of the search region is manipulated when considering whether a sub-quad falls wholly within the original search region;

if the search region overlaps a sub-quad, it is cropped to fall within the bounds of sub-quad before a wholly contained comparison is made.

9. A computer program, or a suite or computer programs, embodied in tangible form in a computer program storage medium and comprising a set of instructions to cause a computer, or a suite of computers, to perform the method of claim 1.

10. A computer data signal tangibly embodied to represent sequences of instructions which, when executed by a processor cause the processor to perform the method of claim 1.

11. A retrieval method comprising sending a retrieval request, the retrieval request comprising a signal indicative of an area within which points are to be retrieved and a trigger signal, the trigger signal invoking the method of claim 1.

12. Apparatus for retrieving one or more points that are contained by a predetermined area, the apparatus comprising:

input means arranged to receive a retrieval request, the retrieval request comprising a signal indicative of the predetermined area;

storage means arranged to store data indicative of one or more regions, each region encompassing one or more points;

linking data associated with the regions, wherein each item of linking data identifies the point or points encompassed by a respective region;

data identifying the points;

retrieving means arranged to access the store and retrieve one or more points corresponding to the predetermined area; and output means arranged to output the one or more retrieved points, the apparatus being arranged, in response to receipt of a retrieval request, such that the retrieving means retrieves a region from the store and performs a process in respect of the retrieved region, the process comprising:

comparing extents of the region with extents of the predetermined area to establish whether the region overlaps with the predetermined area; and if there is overlap, retrieving data identifying sub-regions of the region and identifying any such sub-regions whose extents are wholly within the predetermined area;

the retrieving means then, for each sub-region, repeating the process until all sub-regions thereof falling wholly within the predetermined area are identified accessing linking data corresponding to the identified sub-regions and retrieving points encompassed by the sub-regions, whereupon the output means outputs the retrieved points wherein:

the area represented by the total set of points is first divided into top level quads:

each quad is examined for the presence of points:

quads which do not contain points are not considered further;

the boundaries of quads which do contain one or more points are shrunk wrapped around the set of contained points;

if the quad only contains a single point, then the shrink wrapping reduces to zero, the point is associated with that quad and processing ends for that particular quad;

where more than one point is present in a quad, the shrunk wrap area is divided into first level sub quads and the shrink wrap procedure is repeated on each of the first level sub-quads; and subsequent lower level sub-quads are produced until each point is associated with a single quad.

13. Server apparatus for retrieving one or more points that are contained by a predetermined area, the server apparatus comprising:

input means arranged to receive a retrieval request, the retrieval request comprising a signal indicative of the predetermined area;

accessing means arranged to access a store in respect of the predetermined area; and receiving means arranged to receive data from the store;

the store comprising data indicative of one or more regions, each region encompassing one or more points; the store further comprising linking data associated with the regions, which linking data identifies the point or points encompassed by that region;

the store being in operative association with query means for querying the store, the query means being arranged to identify one or more regions that are contained by the predetermined area, access linking data corresponding thereto and transmit the accessed linking data to the server apparatus wherein:

the area represented by the total set of points is first divided into top level quads;

each quad is examined for the presence of points;

quads which do not contain points are not considered further;

the boundaries of quads which do contain one or more points are shrunk wrapped around the set of contained points;

if the quad only contains a single point, then the shrink wrapping reduces to zero, the point is associated with that quad and processing ends for that particular quad;

where more than one point is present in a quad, the shrunk wrap area is divided into first level sub quads and the shrink wrap procedure is repeated on each of the first level sub-quads; and subsequent lower level sub-quads are produced until each point is associated with a single quad.

* * * * *